(12) United States Patent
Stepin et al.

(10) Patent No.: US 11,991,354 B2
(45) Date of Patent: May 21, 2024

(54) CLIPPING LEVELS FOR NON-LINEAR ADAPTIVE LOOP FILTER

(71) Applicant: HUAWEI TECHNOLOGIES CO., LTD., Guangdong (CN)

(72) Inventors: Victor Alexeevich Stepin, Moscow (RU); Sergey Yurievich Ikonin, Moscow (RU); Elena Alexandrovna Alshina, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 134 days.

(21) Appl. No.: 17/561,087

(22) Filed: Dec. 23, 2021

(65) Prior Publication Data

US 2022/0116598 A1 Apr. 14, 2022

Related U.S. Application Data

(63) Continuation of application No. PCT/CN2020/098229, filed on Jun. 24, 2020.
(Continued)

(30) Foreign Application Priority Data

Jun. 24, 2019 (WO) ................ PCT/RU2019/000454
Jun. 25, 2019 (WO) ................ PCT/RU2019/000456
(Continued)

(51) Int. Cl.
*H04N 19/117* (2014.01)
*H04N 19/136* (2014.01)
(Continued)

(52) U.S. Cl.
CPC ......... *H04N 19/117* (2014.11); *H04N 19/136* (2014.11); *H04N 19/172* (2014.11); *H04N 19/196* (2014.11); *H04N 19/82* (2014.11)

(58) Field of Classification Search
None
See application file for complete search history.

(56) References Cited

U.S. PATENT DOCUMENTS

| 10,621,731 B1 | 4/2020 | Duenas et al. |
| 2011/0274158 A1 | 11/2011 | Fu et al. |

(Continued)

FOREIGN PATENT DOCUMENTS

| CN | 103051890 A | 4/2013 |
| GB | 2582031 A | 9/2020 |

(Continued)

OTHER PUBLICATIONS

Huang Xuan et al., An Architecture and VLSI I mple mentation of Deblocking Filter for AVS HDTV Application, Chinese Acade my of Science, Mar. 2010, with an English abstract total 5 pages.
(Continued)

*Primary Examiner* — Xiaolan Xu
(74) *Attorney, Agent, or Firm* — WOMBLE BOND DICKINSON (US) LLP

(57) ABSTRACT

A method for in-loop filtering by performing adaptive loop filtering on a reconstructed frame of a video stream, implemented by an encoding device or a decoding device, the method comprising forming differences between a pixel of the reconstructed frame and neighboring pixels in a connected area of the pixel, clipping the differences according to respective clipping levels, forming a weighted sum of the clipped differences, and adding the weighted sum to the pixel to determine a filtered pixel, wherein the respective clipping levels are chosen from a same set of clipping levels for the luma and chroma components.

20 Claims, 13 Drawing Sheets

Related U.S. Application Data

(60) Provisional application No. 62/871,200, filed on Jul. 7, 2019.

(30) Foreign Application Priority Data

Jul. 3, 2019 (WO) ................ PCT/RU2019/000476
Jul. 8, 2019 (WO) ................ PCT/RU2019/000483

(51) Int. Cl.
*H04N 19/172* (2014.01)
*H04N 19/196* (2014.01)
*H04N 19/82* (2014.01)

(56) References Cited

U.S. PATENT DOCUMENTS

| | | |
|---|---|---|
| 2013/0177085 A1 | 7/2013 | Zhang et al. |
| 2017/0163982 A1 | 6/2017 | Fu et al. |
| 2018/0098082 A1 | 4/2018 | Burns et al. |

FOREIGN PATENT DOCUMENTS

| | | | |
|---|---|---|---|
| JP | 2019114961 A | 7/2019 | |
| JP | 2021002726 A | 1/2021 | |
| RU | 2636103 C2 | 11/2017 | |
| WO | 2012144876 A2 | 10/2012 | |

OTHER PUBLICATIONS

Document: JVET-N0242, Jonathan Taquet et al, CE5: Results of tests CE5-3.1 to CE5-3.4 on Non-Linear Adaptive Loop Filter., Joint Video Experts Team (JVET) of ITU-T SG 16 WP 3 and ISO/IECJTC 1/SC 29/WG11, 14th Meeting: Geneva, CH, Mar. 19-27, 2019, total 10 pages. XP030209885.
ITU-T H.264(Apr. 2017), Series H: Audiovisual and Multimedia Systems, Infrastructure of audiovisual services—Coding of moving video, Advanced video coding for generic audiovisual services, total 812 pages.
Document: JVET-N0243, Jonathan Taquet et al, Non-CE5: Complementary results of tests CE5-3 on Non-Linear ALF, Joint Video Experts Team (JVET) of ITU-T SG 16 WP 3 and ISO/IECJTC 1/SC 29/WG11, 14th Meeting: Geneva, CH, Mar. 19-27, 2019, total 10 pages. XP030209890.
ITU-T H.265(Feb. 2018), Series H: Audiovisual and Multimedia Systems Infrastructure of audiovisual services—Coding of moving video, High efficiency video coding, total 692 pages.
Document: JVET-N1002-v1, Jianle Chen et al, Algorithm description for Versatile Video Coding and Test Model 5 (VTM 5), Joint Video Experts Team (JVET) of ITU-T SG 16 WP 3 and ISO/IEC JTC 1/SC 29/WG 11, 14th Meeting: Geneva, CH, Mar. 19-27, 2019, total 70 pages. XP030212629.
ISO/IEC 23008-2:2013, Information technology—High efficiency coding and media delivery in heterogeneous environments—Part 2: High efficiency video coding, Dec. 2013, total 13 pages.
Document: JVET-O0188, Sergey Ikonin et al, Non-CE5: Non-linear ALF simplifications, Joint Video Experts Team (JVET) of ITU-T SG 16 WP 3 and ISO/IECJTC 1/SC 29/WG11, 15th Meeting: Gothenburg, SE, Jul. 3-12, 2019, total 8 pages. XP030218790.
Qian Chen et al, Classi ed Quadtree-based Adaptive Loop Filter, 2011 IEEE International Conference on Multimedia and Expo, total 6 pages.
Document: JVET-O0386, Kyohei Unno et al, Non-CE5: A simplification of clipping thresholds for Non-Linear ALF, Joint Video Experts Team (JVET) of ITU-T SG 16 WP 3 and ISO/IECJTC 1/SC 29/WG11 15th Meeting: Gothenburg, SE, Jul. 3-12, 2019, total 6 pages. XP030219424.
Gary J. Sullivan et al, Overview of the High Ef ciency Video Coding (HEVC) Standard, IEEE Transactions on Circuits and Systems for Video Technology, vol. 22, No. 12, Dec. 2012, total 20 pages.
Document: JVET-O0532-v1, Nan Hu et al, Non-CE5: Simplification on clipping value calculation for adaptive loop filter, Joint Video Experts Team (JVET) of ITU-T SG 16 WP 3 and ISO/IECJTC 1/SC 29/WG11, 15th Meeting: Gothenburg, SE, Jul. 3-12, 2019, total 4 pages. XP030219830.
Document: JVET-M0385, Jonathan Taquet et al, Non-Linear Adaptive Loop Filter, Joint Video Experts Team (JVET) of ITU-T SG 16 WP 3 and ISO/IEC JTC 1/SC 29/WG 11, 13th Meeting: Marrakech, MA, Jan. 9-18, 2019, total 5 pages.
Vadim Seregin et al, CE5: Summary Report on Adaptive Loop Filter, Joint Video Experts Team (JVET) of ITU-T SG16 WP3 and ISO/IEC JTC 1/SC 29/WG 11, JVET-N0025, 14th Meeting: Geneva, Mar. 19-27, 2019.

Luma: filterClips[ sfIdx ][ j ] = Round( 2^( BitDepthY * ( 4 − alf_luma_clip_idx[ sfIdx ][ j ] ) / 4 ) )

Chroma: AlfClipC[ adaptation_parameter_set_id ][ j ] =
Round( 2^( BitDepthC − 8 ) * 2( 8 * ( 3 − alf_chroma_clip_idx[ j ] ) / 3 ) )

Luma: filterClips[ sfIdx ][ j ] = Round( 2^( BitDepthY * ( 4 − alf_luma_clip_idx[ sfIdx ][ j ] ) / 4 ) − 1 )

Chroma: AlfClipC[ adaptation_parameter_set_id ][ j ] =
Round( 2^( BitDepthC * ( 4 − alf_chroma_clip_idx[ sfIdx ][ j ] ) / 4 ) − 1 )

Clipping level modification $O'(x,y) = I(x,y) + \sum_{(i,j)\neq(0,0)} w(i,j) \times \{Clip[\Delta(x,y,i,j), Lim(i,j)] + Clip[\Delta(x,y,-i,-j), Lim(i,j)]\}$ $\Delta(x,y,i,j) = I(x+i, y+j) - I(x,y)$ $Clip(d,b) = \min(b, \max(-b, d))$ $Lim(i,j) = 2^{BitDepthLuma * \frac{[4-Idx(i,j)]}{4}}$ for luma filtering $Lim(i,j) = 2^{(BitDepth-8)+8*\frac{[3-Idx(i,j)]}{3}}$ for chroma filtering

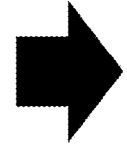

$Lim(i,j) = 2^{BitDepthLuma * \frac{[4-Idx(i,j)]}{4}} - 1$ for luma filtering $Lim(i,j) = 2^{BitDepthChroma * \frac{[4-Idx(i,j)]}{4}} - 1$ for chroma filtering $Idx(i,j) = 0,1,2,3$

FIG. 7

CLIPPING LEVELS FOR NON-LINEAR ADAPTIVE LOOP FILTER

CROSS-REFERENCE TO RELATED APPLICATIONS

This application is a continuation of International Application No. PCT/CN2020/098229, filed on Jun. 24, 2020, which claims priority to International Patent Application No. PCT/RU2019/000483, filed on Jul. 8, 2019 and International Application No. PCT/RU2019/000476, filed on Jul. 3, 2019 and International Application No. International Application No. PCT/RU2019/000456, filed on Jun. 25, 2019 and International Patent Application No. PCT/RU2019/000454, filed on Jun. 24, 2019, which claims priority to U.S. provisional Patent Application No. 62/871,200, filed on Jul. 7, 2019. The disclosures of the aforementioned applications are hereby incorporated by reference in their entireties.

TECHNICAL FIELD

Generally, the present disclosure relates to the field of video coding. More specifically, the present disclosure relates to a filter (such as a non-linear in-loop filter) for video coding and a method for filtering reconstructed video frames as well as an encoding apparatus and a decoding apparatus comprising the filter for video coding.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

The recently adopted ITU-T H.265/HEVC standard (ISO/IEC 23008-2:2013, "Information technology—High efficiency coding and media delivery in heterogeneous environments—Part 2: High efficiency video coding", November 2013) declares a set of state-of-the-art video coding tools that provide a reasonable tradeoff between coding efficiency and computational complexity.

An overview on the ITU-T H.265/HEVC standard has been given by Gary J. Sullivan, "Overview of the High Efficiency Video Coding (HEVC) Standard", in IEEE Transactions on Circuits and Systems for Video Technology, Vol. 22, No. 12, December 2012, the entire content of which is incorporated herein by reference.

One of the video coding tools from this standard is the adaptive loop filter which performs filtering on a reconstructed frame before using this frame for prediction. A conventional adaptive loop filter is described in Qian Chen, Yunfei Zheng, Peng Yin, Xiaoan Lu, Joel Sol'e, Qian Xu, Edouard Francois, and Dapeng Wu, "Classified Quadtree-based Adaptive Loop Filter", 2011 IEEE International Conference on Multimedia and Expo, Pages: 1-6. In this filter, each pixel of the filtered reconstructed frame is a weighted sum of several pixels in the connected area of the pixel from the reconstructed frame around the position of the generating filtered pixel. The connected area of the pixel is generally defined as a set of neighboring pixels of that pixel. The set may be symmetrically arranged around the pixel wherein modifications may be applied near a boundary of the reconstructed frame or a boundary of a reconstructed block. Frequently used sets may have the shape of a diamond such as a 7×7 diamond shape for the luma component or a 5×5 diamond shape for the chroma components as shown in FIG. 12.

The filtering process of the (linear) Adaptive Loop Filter is performed as follows:

$$O(x,y) = \Sigma_{(i,j)} w(i,j) * I(x+i, y+j),$$

wherein samples I(x+i,y+j) are input reconstructed samples from the connected area of the pixel with coordinates (x,y), O(x,y) is the filtered output reconstructed sample (i.e. filter result), and w(i,j) denotes the filter coefficients.

The above-described equation can be modified (according to the non-linear Adaptive loop filter method, described in JVET-M0385 which is publicly available under http://phenix.it-sudparis.eu/jvet/), without coding efficiency impact, in the following expression:

$$O'(x, y) = I(x, y) + \sum_{(i,j) \neq (0,0)} w(i, j) * \{\text{Clip}[\Delta(x, y, i, j),$$

$$\text{Lim}(i, j)] + \text{Clip}[\Delta(x, y, -i, -j), \text{Lim}(i, j)]\}$$

$$\Delta(x, y, i, j) = I(x+i, y+j) - I(x, y)$$

$$\text{Clip}(d, b) = \min(b, \max(-b, d))$$

$$\text{Lim}(i, j) = 2^{BitDepthLuma * \frac{[4-Idx(i,j)]}{4}} \text{ for luma filtering}$$

$$\text{Lim}(i, j) = 2^{(BitDepthChroma-8)+8*\frac{[3-Idx(i,j)]}{3}} \text{ for chroma filtering}$$

$$Idx(i, j) = 0, 1, 2 \text{ or } 3$$

If the maximal weight coefficient w(i,j) is an n-bit integer value, BitDepthLuma is the luma component bit depth (maximal number of bits in luma pixel), BitDepthChroma is the chroma component bit depth, then filter implementation requires N integer multiplications of n-bit values by (BitDepthLuma+3)-bit values for luma component filtering and by (BitDepthChroma+3)-bit values for chroma component filtering, wherein N is the filter length.

SUMMARY OF THE DISCLOSURE

The methods described below provide a low complexity non-linear in-loop filter which requires N multiplications of n-bit filter coefficients by (BitDepthLuma+2)-bit values instead of N multiplications of n-bit filter coefficients by (BitDepthChroma+3)-bit values in the state of the art solution for the luma component. For the chroma component, the methods described below provide a low complexity non-linear in-loop filter which requires N multiplications of n-bit filter coefficients by (BitDepthChroma+2)-bit values instead of N multiplications of n-bit filter coefficients by (BitDepthChroma+3)-bit values in the state of the art solution.

Embodiments of the present disclosure provide an improved low complexity in-loop filter for reconstructed frame filtering.

Embodiments of the present disclosure allow decreasing the complexity of the required multiplications without filtering quality degradation.

The foregoing and other objects are achieved by the subject matter of the independent claims. Further implementation forms are apparent from the dependent claims, the description and the figures.

An embodiment of the present disclosure provides a method for in-loop filtering by performing adaptive loop filtering on a reconstructed frame of a video stream, implemented by an encoding device or a decoding device, wherein the method comprises forming/determining differences between at least one of luma and chroma components of a pixel of the reconstructed frame and the at least one of luma and chroma components of neighboring pixels in a connected area of the pixel, clipping the differences according to respective clipping levels, forming/determining a weighted sum of the clipped differences, and adding the weighted sum to the at least one of luma and chroma components of the pixel to determine a filtered respective component of the pixel, wherein the respective clipping levels are chosen from a same set of clipping levels for the luma and chroma components.

According to the present disclosure, the adaptive loop filtering can be applied to one or more of the luma and chroma components of a pixel of the reconstructed frame. If the adaptive loop filtering is applied to two or more components, in particular all of the luma and chroma components of a pixel, the filtering is performed separately for each component. In other words, the operations of the above method which are described in more detail in the following are separately performed on each component that is submitted to adaptive loop filtering.

The adaptive loop filtering may be applied to a single pixel of the reconstructed frame, a group of pixels, in particular corresponding to a block, such as a coding block, or all of the pixels of the reconstructed frame.

As mentioned above, the connected area of the pixel may generally be defined as a set of neighboring pixels of that pixel. The set may be symmetrically arranged around the pixel wherein modifications may be applied near a boundary of the reconstructed frame or a boundary of a reconstructed block. Frequently used sets may have the shape of a diamond such as a 7×7 diamond shape for the luma component or a 5×5 diamond shape for the chroma components.

For each neighboring pixel in the connected area, a difference between the at least one of luma and chroma components, i.e. the luma component or a chroma component, of a pixel of the reconstructed frame and the at least one of luma and chroma components, i.e. the luma component or the respective chroma component, of the neighboring pixel is determined. Each of the resulting differences is clipped according to its respective clipping level. In other words, each neighboring pixel in the connected area has an associated respective clipping level for each of the at least one of luma and chroma components. The respective clipping levels thus depend on the component being filtered as well as the offset (i,j) of the coordinates (x+i,y+j) of the corresponding neighboring pixel with regard to the coordinates (x,y) of the pixel whose at least one of luma and chroma components is being filtered.

Independently of which component, i.e. the luma component or one of the two chroma components, of the pixel is filtered, the respective clipping levels are chosen from a single set of clipping levels. The same set of clipping levels may in particular include all of the allowed or possible clipping levels for both luma and chroma components.

Choosing the clipping levels for luma and chroma components from the same set of possible clipping levels may simplify the implementation of the non-linear adaptive loop filter. In particular, the determination of the clipping levels, whether from formulas or a table, may be simplified.

The respective clipping levels may be chosen according to a bit depth of the at least one of luma and chroma components. Alternatively or additionally, the respective clipping levels may be chosen according to respective clipping indices for the respective neighboring pixels in the connected area. In other words, for each neighboring pixel, a corresponding clipping level is chosen according to a clipping index for that neighboring pixel which may be different for different components of that neighboring pixel.

Choosing the respective clipping levels from a same set of clipping levels for the luma and chroma components may in particular imply that the same clipping level is chosen for the luma component and the chroma components for a specific clipping index if the luma and chroma components have the same bit depth. In other words, the bit depth and the clipping index uniquely identify a clipping level in the set of clipping levels independent of whether luma filtering or chroma filtering is performed. The set of clipping levels may thus be unified for the luma and chroma components insofar as the same clipping level is chosen from the set of clipping levels for luma and chroma components of identical bit depth for the same clipping index. This does not exclude that different clipping levels may be chosen for luma and chroma components of a neighboring pixel if the luma and chroma components of the neighboring pixel have different bit depths and/or different clipping indices.

The respective clipping indices may be signaled in the video stream.

The respective clipping levels may be positive clipping values that are less than or equal to $2^{BitDepth}-1$, wherein BitDepth denotes the bit depth of the at least one of luma and chroma components. Alternatively, the respective clipping levels may be positive clipping values that are less than or equal to $2^{BitDepth}$, wherein BitDepth denotes the bit depth of the at least one of luma and chroma components.

The first limits for the clipping levels may allow reducing the filtering multiplication bit depth by 1 bit as compared to the state of the art for each of the multiplications that saves hardware square area.

According to an implementation, the filtered respective component O'(x,y) of the pixel with coordinates (x,y) in the reconstructed frame may be obtained according to the following equation:

$$O'(x, y) = I(x, y) + \sum_{(i,j)\neq(0,0)} w(i, j) \times \{\text{Clip}[\Delta(x, y, i, j), \text{Lim}(i, j)] + \text{Clip}[\Delta(x, y, -i, -j), \text{Lim}(i, j)]\}$$

$$\Delta(x, y, i, j) = I(x+i, y+j) - I(x, y)$$

$$\text{Clip}(\Delta, \text{Lim}) = \text{Clip3}(-\text{Lim}(i, j), \text{Lim}(i, j), \Delta)$$

$$\text{Clip3}(x, y, z) = \begin{cases} x; & z < x \\ y; & z > y \\ z; & \text{otherwise} \end{cases}$$

wherein I(x+i,y+j) are positive BitDepthLuma-bit values for luma components or BitDepthChroma-bits values for chroma components of the pixels with coordinates (x+i,y+$j$) in the reconstructed frame, w(i,j) denotes n-bit integer filter coefficients corresponding to neighboring pixels in the connected area of the pixel whose positions have offsets (i,j) in respect to the filtered pixel, and Lim(i,j) denotes the respective clipping levels corresponding to the neighboring pixels in the connected area of the pixel with offsets (i,j).

The respective clipping levels may be positive k-bits clipping values with k<=BitDepth, wherein BitDepth denotes the bit depth of the at least one of luma and chroma components.

The respective clipping levels may in particular be Lim(i,j)<=$2^{BitDepthLuma}$−1 for luma components and Lim(i,j)<=$2^{BitDepthChroma}$−1 for chroma components. Alternatively, the respective clipping levels may in particular be Lim(i,j)<=$2^{BitDepthLuma}$ for luma components and Lim(i,j)<=$2^{BitDepthChroma}$ for chroma components.

According to an implementation, the respective clipping levels may be chosen from a look-up table (LUT) representing the set of possible clipping levels for the luma and chroma components.

Providing in the clipping levels in the form of an LUT may further simplify the implementation of the non-linear ALF. The respective clipping level may be determined at the decoder side from the respective bit depth and a clipping index clipIdx which may be encoded into and parsed from the bitstream.

The LUT may be defined as follows:

| BitDepth | clipIdx | | | |
|---|---|---|---|---|
| | 0 | 1 | 2 | 3 |
| 8 | $2^8 - 1$ | $2^5$ | $2^3$ | $2^1$ |
| 9 | $2^9 - 1$ | $2^6$ | $2^4$ | $2^2$ |
| 10 | $2^{10} - 1$ | $2^7$ | $2^5$ | $2^3$ |
| 11 | $2^{11} - 1$ | $2^8$ | $2^6$ | $2^4$ |
| 12 | $2^{12} - 1$ | $2^9$ | $2^7$ | $2^5$ |
| 13 | $2^{13} - 1$ | $2^{10}$ | $2^8$ | $2^6$ |
| 14 | $2^{14} - 1$ | $2^{11}$ | $2^9$ | $2^7$ |
| 15 | $2^{15} - 1$ | $2^{12}$ | $2^{10}$ | $2^8$ |
| 16 | $2^{16} - 1$ | $2^{13}$ | $2^{11}$ | $2^9$ | wherein BitDepth denotes the bit depth of the at least one of luma and chroma components and clipIdx denotes a clipping index.

Alternatively, the LUT may be defined as follows:

| BitDepth | clipIdx | | | |
|---|---|---|---|---|
| | 0 | 1 | 2 | 3 |
| 8 | $2^8$ | $2^5$ | $2^3$ | $2^1$ |
| 9 | $2^9$ | $2^6$ | $2^4$ | $2^2$ |
| 10 | $2^{10}$ | $2^7$ | $2^5$ | $2^3$ |
| 11 | $2^{11}$ | $2^8$ | $2^6$ | $2^4$ |
| 12 | $2^{12}$ | $2^9$ | $2^7$ | $2^5$ |
| 13 | $2^{13}$ | $2^{10}$ | $2^8$ | $2^6$ |
| 14 | $2^{14}$ | $2^{11}$ | $2^9$ | $2^7$ |
| 15 | $2^{15}$ | $2^{12}$ | $2^{10}$ | $2^8$ |
| 16 | $2^{16}$ | $2^{13}$ | $2^{11}$ | $2^9$ | wherein BitDepth denotes the bit depth of the at least one of luma and chroma components and clipIdx denotes a clipping index.

The set of clipping levels Lim(i,j) for the luma and chroma components may be determined according to the following equations:

$$\text{Lim}(i, j) = 2^{BitDepthLuma * \frac{[4-Idx(i,j)]}{4}} \text{ for luma components}$$

$$\text{Lim}(i, j) = 2^{BitDepthChroma * \frac{[4-Idx(i,j)]}{4}} \text{ for chroma components}$$

through variation of the bit depth of the luma component BitDepthLuma and the chroma components BitDepthChroma as well as an index Idx(i,j).

Alternatively, the set of clipping levels Lim(i,j) for the luma and chroma components may be determined according to the following equations:

$$\text{Lim}(i, j) = 2^{BitDepthLuma * \frac{[4-Idx(i,j)]}{4}} - 1 \text{ for luma component}$$

$$\text{Lim}(i, j) = 2^{BitDepthChroma * \frac{[4-Idx(i,j)]}{4}} - 1 \text{ for chroma components}$$

$Idx(i, j) = 0$ and/or $$\text{Lim}(i, j) = 2^{BitDepthLuma * \frac{[4-Idx(i,j)]}{4}} \text{ for luma component}$$

$$\text{Lim}(i, j) = 2^{BitDepthChroma * \frac{[4-Idx(i,j)]}{4}} \text{ for chroma components}$$

$Idx(i, j) > 0$ through variation of the bit depth of the luma component BitDepthLuma and the chroma components BitDepthChroma as well as an index Idx(i,j).

Alternatively, the set of clipping levels Lim(i,j) for the luma and chroma components may be determined according to the following equations:

$$\text{Lim}(i, j) = 2^{BitDepth * \frac{[4-Idx(i,j)]}{4}} - 1$$

$Idx(i, j) = 0$ and/or $$\text{Lim}(i, j) = 2^{BitDepthLuma * \frac{[4-Idx(i,j)]}{4}} \text{ for luma filtering}$$

$Idx(i, j) > 0$ through variation of the bit depth of the luma or components BitDepth as well as an index Idx(i,j).

The LUT representing the set of clipping levels Lim(i,j) for the luma and chroma components may be obtained according to the following equations:

$$\text{Lim}(i, j) = 2^{BitDepthLuma * \frac{[4-Idx(i,j)]}{4}} \text{ for luma component}$$

$$\text{Lim}(i, j) = 2^{BitDepthChroma * \frac{[4-Idx(i,j)]}{4}} \text{ for chroma components}$$

through variation of the bit depth of the luma component BitDepthLuma and the chroma components BitDepthChroma as well as an index Idx(i,j).

Alternatively, the LUT representing the set of clipping levels Lim(i,j) for the luma and chroma components may be determined according to the following equations:

$$\text{Lim}(i, j) = 2^{BitDepthLuma * \frac{[4-Idx(i,j)]}{4}} - 1 \text{ for luma component}$$

$$\text{Lim}(i, j) = 2^{BitDepthChroma * \frac{[4-Idx(i,j)]}{4}} - 1 \text{ for chroma components}$$

$$Idx(i, j) = 0$$

and/or $$\text{Lim}(i, j) = 2^{BitDepthLuma * \frac{[4-Idx(i,j)]}{4}} \text{ for luma component}$$

$$\text{Lim}(i, j) = 2^{BitDepthChroma * \frac{[4-Idx(i,j)]}{4}} \text{ for chroma components}$$

$$Idx(i, j) > 0$$

through variation of the bit depth of the luma component BitDepthLuma and the chroma components BitDepthChroma as well as an index Idx(i,j).

Alternatively, the LUT representing the set of clipping levels Lim(i,j) for the luma and chroma components may be determined according to the following equations:

$$\text{Lim}(i, j) = 2^{BitDepth * \frac{[4-Idx(i,j)]}{4}} - 1$$

$$Idx(i, j) = 0$$

and/or $$\text{Lim}(i, j) = 2^{BitDepth * \frac{[4-Idx(i,j)]}{4}}$$

$$Idx(i, j) > 0$$

through variation of the bit depth of the luma or chroma components BitDepth as well as an index Idx(i,j).

According to an implementation, the index Idx(i,j) is chosen from a range of positive values from 0 to m, wherein m is positive integer value, for the set of clipping levels. According to an implementation, Idx(i,j)=0, 1, 2, . . . , m with m a positive integer for the set of possible clipping levels. m may be set equal to 3.

According to an implementation, the set of possible clipping levels Lim(i,j) for the luma and chroma components may be determined according to the following equations:

Lim(i,j)=[1<<(BitDepthLuma−ShiftConst[Idx(i,j)])]
for luma component

Lim(i,j)=[1<<(BitDepthChroma−ShiftConst[Idx(i,j)])]
for chroma components

Idx(i,j)=0,1,2,3

ShiftConst[0]=0,ShiftConst[1]=3,ShiftConst[2]=5, ShiftConst[3]=7

Or

ShiftConst[0]=0,ShiftConst[1]=2,ShiftConst[2]=4, ShiftConst[3]=6 through variation of the bit depth of the luma component BitDepthLuma and the chroma components BitDepthChroma as well as an index Idx(i,j).

In-loop filtering may be applied for luma and chroma components of the reconstructed frame.

According to an aspect of the embodiment, an in-loop filtering apparatus for use in a video encoding apparatus or a decoding apparatus is provided, wherein the in-loop filtering apparatus is configured for processing a reconstructed frame for generation of a filtered reconstructed frame, wherein the reconstructed frame comprises a plurality of pixels, each pixel being associated with a pixel value, and wherein the in-loop filter apparatus comprises one or more processing circuitry configured to carry out any one of the methods according to embodiment.

According to a further aspect of the embodiment, an encoder is provided comprising processing circuitry for carrying out any one of the methods according to the embodiment.

According to a further aspect of the embodiment, a decoder is provided comprising processing circuitry for carrying out any one of the methods according to the embodiment.

According to a further aspect of the embodiment, a computer program product is provided comprising instructions which, when the program is executed by a computer, cause the computer to carry out any one of the methods according to the embodiment.

According to a further aspect of the embodiment, an encoder is provided, comprising one or more processors, and a non-transitory computer-readable storage medium coupled to the one or more processors and storing instructions for execution by the one or more processors, wherein the instructions, when executed by the one or more processors, configure the encoder to carry out any one of the methods according to the embodiment.

According to a further aspect of the embodiment, a decoder is provided, comprising one or more processors, and a non-transitory computer-readable storage medium coupled to the one or more processors and storing instructions for execution by the one or more processors, wherein the instructions, when executed by the one or more processors, configure the decoder to carry out any one of the methods according to the embodiment.

According to a further aspect of the embodiment, an encoder is provided for processing a reconstructed frame for generation of a filtered reconstructed frame, wherein the reconstructed frame comprises a plurality of pixels, each pixel being associated with a pixel value, and wherein the encoder comprises a subtracting unit configured to form/determine differences between at least one of luma and chroma components of a pixel of the reconstructed frame and the at least one of luma and chroma components of neighboring pixels in a connected area of the pixel, a clipping unit configured to clip the differences according to respective clipping levels, a first adding unit configured to form/determine a weighted sum of the clipped differences, and a second adding unit configured to add the weighted sum to the at least one of luma and chroma components of the pixel to determine a filtered respective component of the pixel, wherein the respective clipping levels are chosen from a same set of clipping levels for the luma and chroma components.

According to a further aspect of the embodiment, a decoder is provided for processing a reconstructed frame for generation of a filtered reconstructed frame, wherein the reconstructed frame comprises a plurality of pixels, each pixel being associated with a pixel value, and wherein the decoder comprises a subtracting unit configured to form/determine differences between at least one of luma and chroma components of a pixel of the reconstructed frame and the at least one of luma and chroma components of neighboring pixels in a connected area of the pixel, a clipping unit configured to clip the differences according to respective clipping levels, a first adding unit configured to form/determine a weighted sum of the clipped differences, and a second adding unit configured to add the weighted sum to the at least one of luma and chroma components of the pixel to determine a filtered respective component of the pixel, wherein the respective clipping levels are chosen from a same set of clipping levels for the luma and chroma components.

In the above-described embodiment, differences are formed between the pixel of the reconstructed frame (the filtered pixel or pixel to be filtered) and neighboring pixels in a connected area of the pixel lying on a line along one direction. In other words, a weighted sum of several pixels in the connected area of the pixel from the reconstructed frame around the position of the filtered pixel is formed, wherein the neighboring pixels refer to several pixels around the filtered pixel in the reconstructed frame or block. In an example, the direction may be understood as a line which goes via m points (such as 3 points) with coordinates $(x,y)$, $(x+i, x+j)$, $(x-i, x-j)$. In other words, the filtered pixel corresponds to the coordinate $(x,y)$, and the neighboring pixels correspond to the coordinates $(x+i, x+j)$, $(x-i, x-j)$ respectively, and one clipped difference between the filtered pixel $(x,y)$ and the neighboring pixel $(x+i, x+j)$ and another clipped difference between the filtered pixel $(x,y)$ and the neighboring pixel $(x-i, x-j)$ are formed for each direction and offset $(i,j)$. Multiple directions may be considered to provide a symmetric filtering. Frequently used examples are a 7×7 diamond-shape for luma filtering and a 5×5 diamond-shape for chroma filtering as shown in FIG. 12.

According to a further aspect of the disclosure, the above-described filtering methods of the reconstructed frame can be used on the encoder and decoder side and for luma and chroma components.

According to a further aspect, the disclosure relates to an apparatus for decoding a video stream including a processor and a memory. The memory is storing instructions that cause the processor to perform any one of the methods according to the embodiment.

According to a further aspect, the disclosure relates to an apparatus for encoding a video stream including a processor and a memory. The memory is storing instructions that cause the processor to perform any one of the methods according to the embodiment.

According to a further aspect, a computer-readable storage medium having stored thereon instructions that when executed cause one or more processors configured to code video data is proposed. The instructions cause the one or more processors to perform any one of the methods according to the embodiment.

According to a further aspect, the disclosure relates to a computer program comprising program code for performing any one of the methods according to the embodiment when executed on a computer.

Thus, the described in-loop filter may require for luma components N multiplications of n-bit filter coefficients by (BitDepthLuma+2)-bit values of a sum of two clipped differences between a pixel to be filtered and a neighboring pixel lying on a line along one direction instead of N multiplications of n-bit filter coefficients by (BitDepthLuma+3)-bit values as in the state of the art solution. For chroma components, the in-loop filter may require N multiplications of n-bit filter coefficients by (BitDepthChroma+2)-bit values of a sum of two clipped differences between a pixel to be filtered and a neighboring pixel lying on a line along one direction instead of N multiplications of n-bit filter coefficients by (BitDepthChroma+3)-bit values as in the state of the art solution.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the disclosure are described in more detail with reference to the attached figures and drawings, in which:

FIG. 7 is a schematic diagram illustrating an example mechanism of an exemplary process according to an embodiment of the disclosure;

Figure 1A:
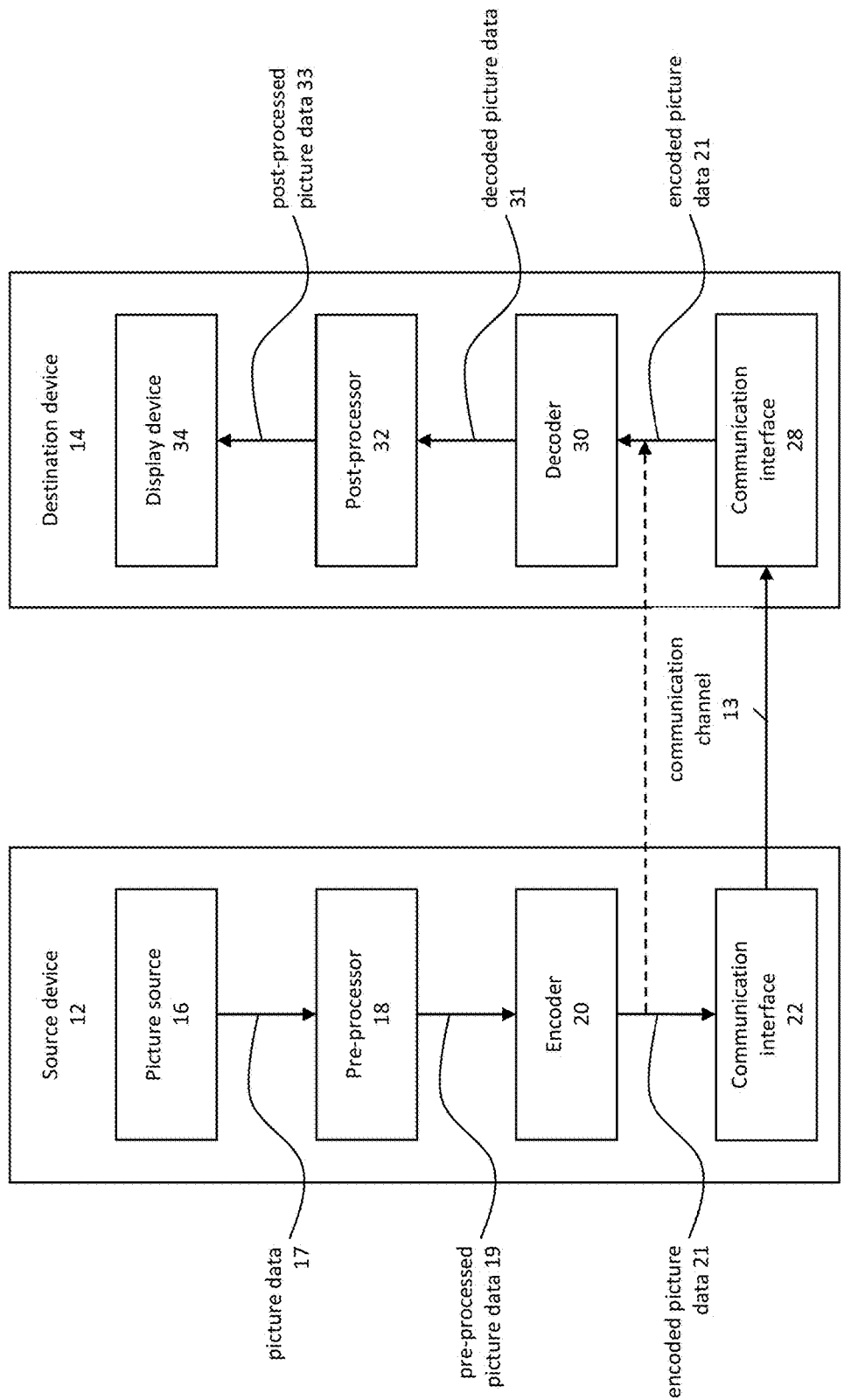
FIG. 1A is a block diagram showing an example of a video coding system configured to implement embodiments of the disclosure.

In the following, identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

The following terminology is used throughout the present disclosure:

coding block: An M×N block of samples for positive integer values of M and N wherein the division of a coding tree block (CTB) into coding blocks is called partitioning.

coding tree block (CTB): An L×L block of samples for a positive integer value of L wherein the division of a component frame into CTBs is called partitioning.

coding tree unit (CTU): comprises CTB of luma samples and two corresponding CTBs of chroma samples of a picture that has three sample arrays, or a CTB of samples of a monochrome picture or a picture that is coded using three separate colour planes and syntax structures used to code the samples.

coding unit (CU): comprises a coding block of luma samples and two corresponding coding blocks of chroma samples of a picture that has three sample arrays, or a coding block of samples of a monochrome picture or a picture that is coded using three separate colour planes and syntax structures used to code the samples.

component: An array or a single sample from one of the three arrays (luma and two chroma) that compose a picture in 4:2:0, 4:2:2, or 4:4:4 colour format or the array or a single sample of the array that composes a picture in monochrome format.

picture: An array of luma samples in monochrome format or an array of luma samples and two corresponding arrays of chroma samples in 4:2:0, 4:2:2, and 4:4:4 colour format.

Video coding typically refers to the processing of a sequence of pictures, which form the video or video sequence. Instead of the term "picture", the term "frame" or "image" may be used as synonyms in the field of video coding. Video coding (or coding in general) comprises two parts: video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss occurs during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 may be configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be an optional component.

The video encoder 20 may be configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 may be configured to receive the encoded picture data 21 (or any further processed version thereof), e.g. directly from the source device 12 or from any other source, e.g. a storage device, such as an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or as bi-directional communication interfaces, and may be configured to send and receive messages, e.g. to set up a connection, to acknowledge and exchange any other information related to the communication link and/or data transmission, such as encoded picture data transmission.

The decoder 30 may be configured to receive the encoded picture data 21 and provide decoded picture data 31 or a decoded picture 31 (further details will be described below, e.g., based on FIG. 3 or FIG. 5).

The post-processor 32 of destination device 14 may be configured to post-process the decoded picture data 31 (also called reconstructed picture data), e.g. the decoded picture 31, to obtain post-processed picture data 33, such as a post-processed picture 33. The post-processing performed by the post-processing unit 32 may comprise any one or more of color format conversion (e.g. from YCbCr to RGB), color correction, trimming, or re-sampling, or any other processing, e.g. for preparing the decoded picture data 31 for display, e.g. by display device 34.

The display device 34 of the destination device 14 may be configured to receive the post-processed picture data 33 for displaying the picture, e.g. to a user or viewer. The display device 34 may be or comprise any kind of display for representing the reconstructed picture, such as an integrated or external display or monitor. The display may be a liquid crystal displays (LCD), an organic light emitting diodes (OLED) display, a plasma display, a projector, a micro LED display, a liquid crystal on silicon (LCoS), a digital light processor (DLP) or any kind of other display.

Although FIG. 1A depicts the source device 12 and the destination device 14 as separate devices, embodiments of devices may also comprise both devices or both functionalities, i.e. the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
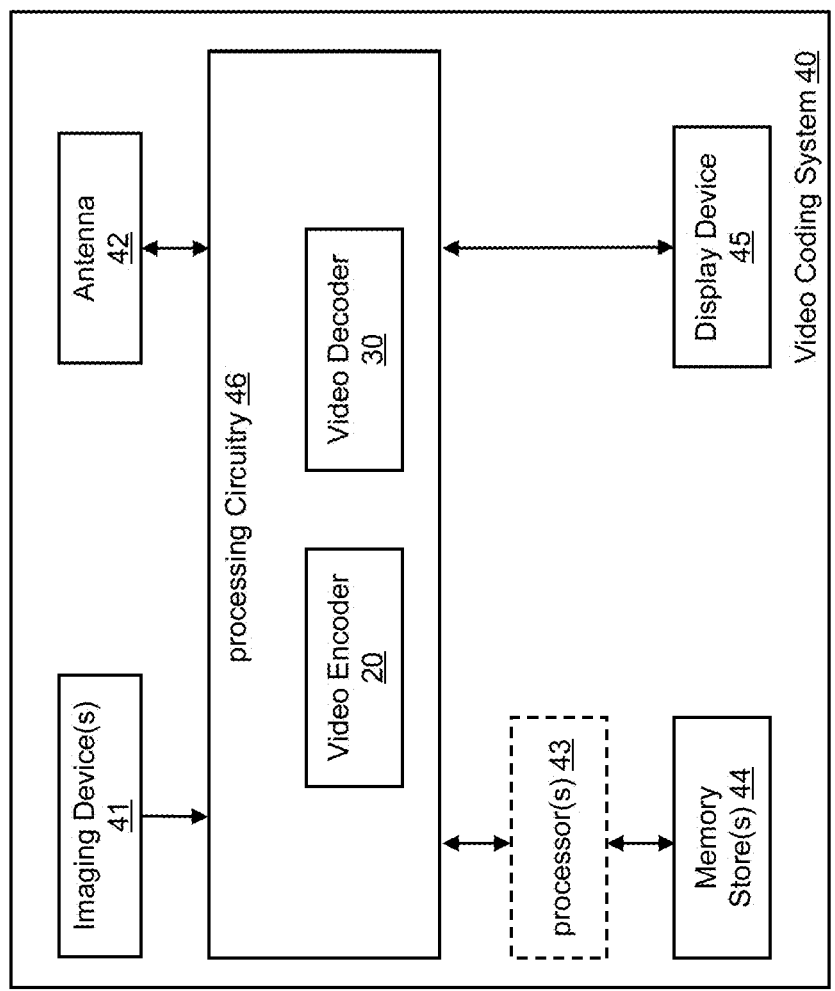
FIG. 1B is a block diagram showing another example of a video coding system configured to implement embodiments of the disclosure.

The encoder 20 (e.g. a video encoder 20) or the decoder 30 (e.g. a video decoder 30) or both, encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Video encoder 20 and video decoder 30 may be integrated as part of a combined encoder/decoder (CODEC) in a single device, for example, as shown in FIG. 1B.

The video coding system 40 shown in FIG. 1B comprises a processing circuitry implementing both a video encoder 20 and a video decoder 30. In addition, one or more imaging devices 41, such as a camera for capturing real-world pictures, an antenna 42, one or more memory stores 44, one or more processors 43 and/or a display device 45, such the display device 34 described above, may be provided as part of the video coding system 40.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver devices, broadcast transmitter devices, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding systems (e.g., video encoding or video decoding) that do not necessarily include any data communication between the encoding and decoding devices. In other examples, data is retrieved from a local memory, streamed over a network, or the like. A video encoding device may encode and store data in memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
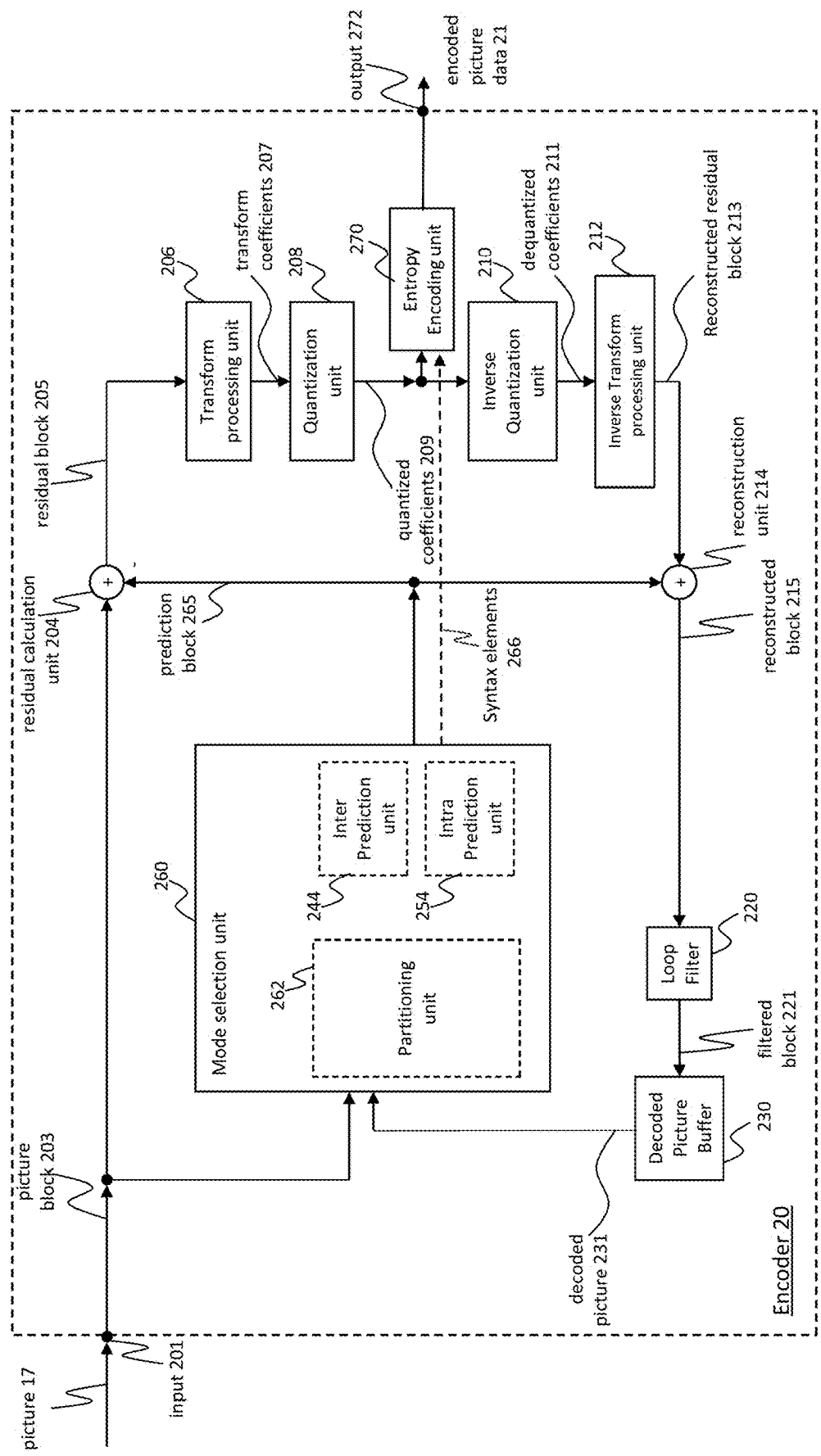
FIG. 2 shows a schematic diagram illustrating an encoding apparatus comprising a filter according to an embodiment of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and an inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. The inter prediction unit 244 may include a motion estimation unit and a motion compensation unit (not shown). A video encoder 20 as shown in FIG. 2 may also be referred to as a hybrid video encoder or a video encoder according to a hybrid video codec.

Figure 3:
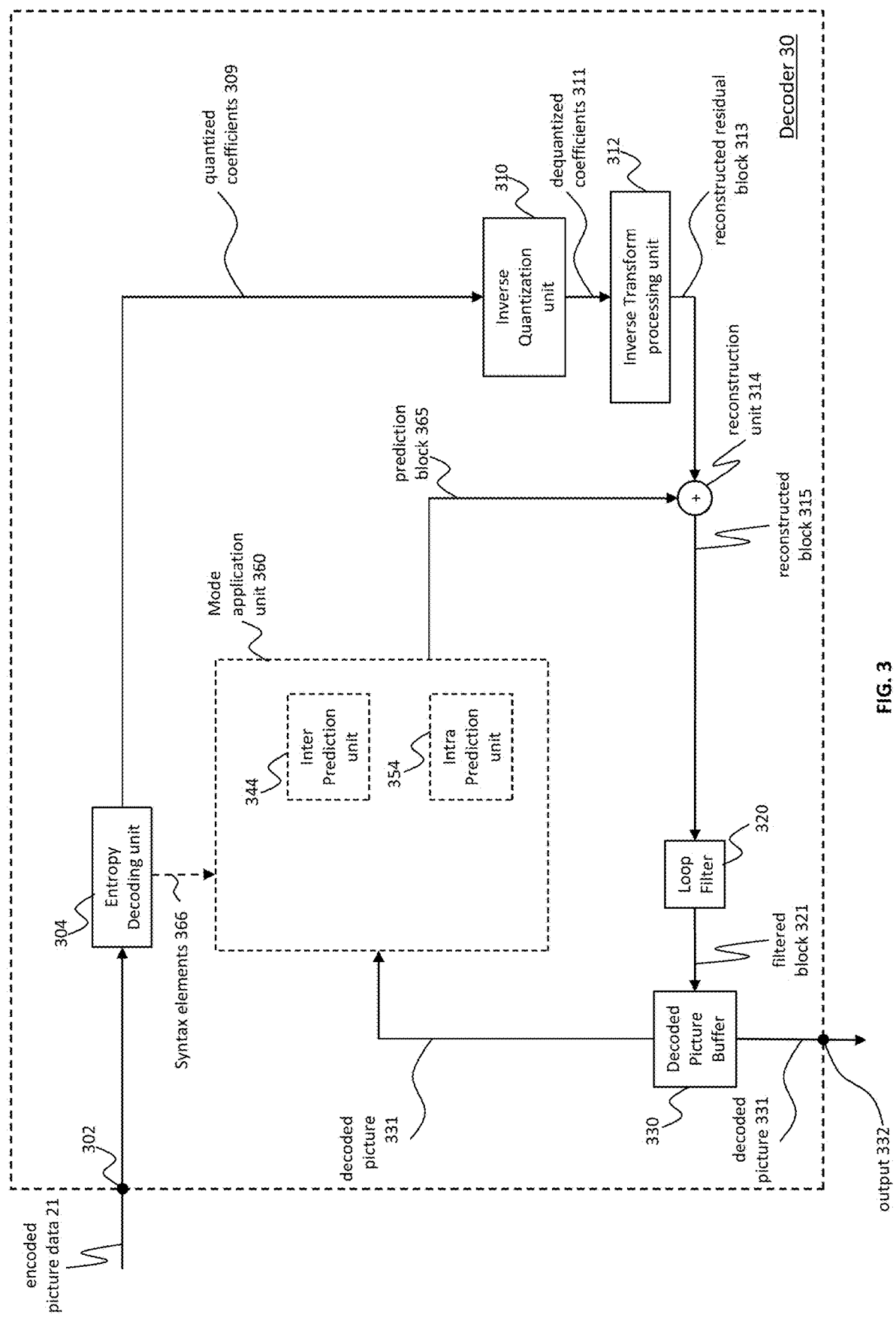
FIG. 3 shows a schematic diagram illustrating a decoding apparatus comprising a filter according to an embodiment of the disclosure.

The residual calculation unit 204, the transform processing unit 206, the quantization unit 208, and the mode selection unit 260 may be referred to as forming a forward signal path of the encoder 20, whereas the inverse quantization unit 210, the inverse transform processing unit 212, the reconstruction unit 214, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. a picture of a sequence of pictures forming a video or video sequence. The received picture or picture data may also be a pre-processed picture 19 (or pre-processed picture data 19). For the sake of simplicity the following description refers to the picture 17. The picture 17 may also be referred to as a current picture or a picture to be coded (in particular, in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in the horizontal and vertical direction (or axis) of the array or picture defines the size and/or resolution of the picture. For representation of color, typically three color components are employed, i.e. the picture may be represented as or include three sample arrays. In RBG format or color space, a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa. The process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (according to H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in the horizontal and vertical direction (or axis) of the block 203 defines the size of the block 203. Accordingly, a block may, for example, comprise an MXN (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video encoder 20 as shown in FIG. 2 may be further configured to partition and/or encode the picture by using slices/tile groups (also referred to as video tile groups) and/or tiles (also referred to as video tiles), wherein a picture may be partitioned into or encoded using one or more slices/tile groups (typically non-overlapping), and each slice/tile group may comprise one or more blocks (e.g. CTUs) or one or more tiles, wherein each tile may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, such as a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively, the transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit transform coefficient during quantization, where n is greater than m. The degree of quantization may be modified by adjusting a quantization parameter (QP). For example for scalar quantization, different scalings may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may, for example, be an index of a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one exemplary implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively, the quantization unit 208) may be configured to output quantization parameters (QPs), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as a transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit may be configured to smooth pixel transitions, or otherwise improve the video quality. The loop filter unit 220 may comprise one or more loop filters such as a de-blocking filter, a sample-adaptive offset (SAO) filter or one or more other filters, such as an adaptive loop filter (ALF), a noise suppression filter (NSF), or any combination thereof. In an example, the loop filter unit 220 may comprise a de-blocking filter, an SAO filter and an ALF filter. The order of the filtering process may be the deblocking filter, SAO and ALF. In another example, a process called luma mapping with chroma scaling (LMCS) (namely, the adaptive in-loop reshaper) is added. This process is performed before deblocking. In another example, the deblocking filter process may be also applied to internal sub-block edges, e.g. affine sub-block edges, ATMVP sub-blocks edge, sub-block transform (SBT) edges and intra sub-partition (ISP) edges. Although the loop filter unit 220 is shown in FIG. 2 as being an in-loop filter, in other configurations, the loop filter unit 220 may be implemented as a post loop filter. The filtered block 221 may also be referred to as a filtered reconstructed block 221.

Embodiments of the video encoder 20 (respectively, the loop filter unit 220) may be configured to output loop filter parameters (such as SAO filter parameters or ALF filter parameters or LMCS parameters), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may also be configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, such as an original block 203 (current block 203 of the current picture 17), and reconstructed picture data, such as filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra- or inter-prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition a picture from a video sequence into a sequence of coding tree units (CTUs) and the CTU 203 may be further partitioned into smaller block partitions or sub-blocks (which again form blocks), e.g. iteratively using quad-tree-partitioning (QT), binary-tree partitioning (BT) or triple-tree-partitioning (TT) or any combination thereof, and to perform the prediction for each of the block partitions or sub-blocks, wherein the mode selection comprises the selection of the tree-structure of the partitioned block 203 and the prediction modes are applied to each of the block partitions or sub-blocks.

In the following, the partitioning (e.g. by partitioning unit 262) and prediction processing (by inter-prediction unit 244 and intra-prediction unit 254) performed by an example video encoder 20 will be explained in more detail.

Partitioning

The partitioning unit 262 may be configured to partition a picture from a video sequence into a sequence of coding tree units (CTUs), and the partitioning unit 262 may partition (or split) a coding tree unit (CTU) 203 into smaller partitions, e.g. smaller blocks of square or rectangular size. For a picture that has three sample arrays, a CTU includes an N×N block of luma samples together with two corresponding blocks of chroma samples. The maximum allowed size of the luma block in a CTU is specified to be 128×128 in the current versatile video coding (VVC) specification, but it may be specified to be value different from 128×128 in the future, for example, 256×256. The CTUs of a picture may be clustered/grouped as slices/tile groups, tiles or bricks. A tile covers a rectangular region of a picture, and a tile can be divided into one or more bricks. A brick consists of a number of CTU rows within a tile. A tile that is not partitioned into multiple bricks can be referred to as a brick. However, a brick is a true subset of a tile and is not referred to as a tile. There are two modes of tile groups supported in VVC, namely the raster-scan slice/tile group mode and the rectangular slice mode. In the raster-scan tile group mode, a slice/tile group contains a sequence of tiles in tile raster scan of a picture. In the rectangular slice mode, a slice contains a number of bricks of a picture that collectively form a rectangular region of the picture. The bricks within a rectangular slice are in the order of brick raster scan of the slice.

The smaller blocks (which may also be referred to as sub-blocks) may be further partitioned into even smaller partitions. This is also referred to as tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as a binary-tree (BT), a tree using partitioning into three partitions is referred to as a ternary-tree (TT), and a tree using partitioning into four partitions is referred to as a quad-tree (QT).

For example, a coding tree unit (CTU) may be or comprise a CTB of luma samples and two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples and two corresponding coding blocks of chroma samples of a picture that has three sample arrays, or a coding block of samples of a monochrome picture or a picture that is coded using three separate colour planes and syntax structures used to code the samples. Correspondingly, a coding block (CB) may be an M×N block of samples for some values of M and N such that the division of a CTB into coding blocks is a partitioning.

In some embodiments, e.g., according to HEVC, a coding tree unit (CTU) may be split into CUs by using a quad-tree structure denoted as a coding tree. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quad-tree structure similar to the coding tree for the CU.

In embodiments, e.g., according to the latest video coding standard currently in development, which is referred to as Versatile Video Coding (VVC), a combined Quad-tree nested multi-type tree using binary and ternary splits segmentation structure is for example used to partition a coding tree unit. In the coding tree structure within a coding tree unit, a CU can have either a square or rectangular shape. For example, the coding tree unit (CTU) is first partitioned by a quaternary tree. Then the quaternary tree leaf nodes can be further partitioned by a multi-type tree structure. There are four splitting types in the multi-type tree structure: vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, prediction units (PU) and transform units (TU) have the same block size in the quadtree with nested multi-type tree coding block structure. An exception occurs when the maximum supported transform length is smaller than the width or height of the colour component of the CU.

VVC develops a unique signaling mechanism of the partition splitting information in quadtree with nested multi-type tree coding tree structure. In the signalling mechanism, a coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU can be derived by a decoder based on a predefined rule or a table. It should be noted, for a certain design, for example, 64×64 Luma block and 32×32 Chroma pipelining design in VVC hardware decoders, TT split is forbidden when either width or height of a luma coding block is larger than 64. TT split is also forbidden when either width or height of a chroma coding block is larger than 32. The pipelining design will divide a picture into Virtual pipeline data units (VPDUs) which are defined as non-overlapping units in a picture. In hardware decoders, successive VPDUs are processed by multiple pipeline stages simultaneously. The VPDU size is roughly proportional to the buffer size in most pipeline stages, so it is important to keep the VPDU size small. In most hardware decoders, the VPDU size can be set to the maximum transform block (TB) size. However, in VVC, ternary tree (TT) and binary tree (BT) partition may lead to an increase of the VPDU's size.

In addition, it should be noted that, when a portion of a tree node block exceeds the bottom or right picture boundary, the tree node block is forced to be split until all samples of every coded CU are located inside the picture boundaries.

As an example, the Intra Sub-Partitions (ISP) tool may divide luma intra-predicted blocks vertically or horizontally into 2 or 4 sub-partitions depending on the block size.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise intra-prediction modes and/or inter-prediction modes.

Intra-Prediction

The set of intra-prediction modes may comprise 35 different intra-prediction modes, such as non-directional modes like DC (or mean) mode and planar mode, or directional modes, e.g. as defined in HEVC, or may comprise 67 different intra-prediction modes, such as non-directional modes like DC (or mean) mode and planar mode, or directional modes, e.g. as defined for VVC. As an example, several conventional angular intra prediction modes are adaptively replaced with wide-angle intra prediction modes for the non-square blocks, e.g. as defined in VVC. As another example, to avoid division operations for DC prediction, only the longer side is used to compute the average for non-square blocks. And, the results of intra prediction of planar mode may be further modified by a position dependent intra prediction combination (PDPC) method.

The intra-prediction unit 254 is configured to use reconstructed samples of neighboring blocks of the same current picture to generate an (intra-)prediction block 265 according to an intra-prediction mode from the set of intra-prediction modes.

The intra-prediction unit 254 (or in general the mode selection unit 260) may be further configured to output intra-prediction parameters (or in general information indicative of the selected intra-prediction mode for the block) to the entropy encoding unit 270 in the form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous, at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, such as half/semi-pel, quarter-pel and/or 1/16 pel interpolation, or not.

In addition to the above prediction modes, skip mode, direct mode and/or other inter prediction mode may be applied.

For example, for extended merge prediction, the merge candidate list of such a mode is constructed by including the following five types of candidates in order: Spatial MVP from spatial neighbor CUs, temporal MVP from co-located CUs, history-based MVP from a FIFO table, pairwise average MVP and Zero MVs. And a bilateral-matching based decoder-side motion vector refinement (DMVR) may be applied to increase the accuracy of the MVs of the merge mode.

Merge mode with MVD (MMVD) is a merge mode with motion vector differences (MVD). An MMVD flag is signaled right after sending a skip flag and merge flag to specify whether MMVD mode is used for a CU. And a CU-level adaptive motion vector resolution (AMVR) scheme may be applied. AMVR allows MVD of the CU to be coded in different precision. Dependent on the prediction mode for the current CU, the MVDs of the current CU can be adaptively selected.

When a CU is coded in merge mode, the combined inter/intra prediction (CIIP) mode may be applied to the current CU. Weighted averaging of the inter and intra prediction signals is performed to obtain the CIIP prediction. In affine motion compensated prediction, the affine motion field of the block is described by motion information of two control point (4-parameter) or three control point (6-parameter) motion vectors. Sub-block-based temporal motion vector prediction (SbTMVP) is similar to the temporal motion vector prediction (TMVP) in HEVC, but predicts the motion vectors of the sub-CUs within the current CU. Bi-directional optical flow (BDOF), previously referred to as BIO, is a simpler version that requires much less computation, especially in terms of number of multiplications and the size of the multiplier. In the triangle partition mode, a CU is split evenly into two triangle-shaped partitions, using either the diagonal split or the anti-diagonal split. Besides, the bi-prediction mode is extended beyond simple averaging to allow weighted averaging of the two prediction signals.

The inter-prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, such as reconstructed blocks of one or a plurality of previously decoded pictures 231, for motion estimation. By way of example, a video sequence may comprise the current picture and the previously decoded pictures 231, or in other words, the current picture and the previously decoded pictures 231 may be part of or form a sequence of pictures forming a video sequence.

The encoder 20 may be configured to select a reference block from a plurality of reference blocks of the same or different pictures of the plurality of previously decoded pictures and provide a reference picture (or reference picture index) and/or an offset (spatial offset) between the position (x,y coordinates) of the reference block and the position of the current block as inter-prediction parameters to the motion estimation unit. This offset is also called motion vector (MV).

The motion compensation unit may be configured to obtain, e.g. receive, an inter-prediction parameter and to perform inter-prediction based on or using the inter-prediction parameter to obtain an (inter-)prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, a context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter-prediction parameters, intra-prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of the present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile group or tile) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter-prediction unit 344 and an intra-prediction unit 354. Inter-prediction unit 344 may be or include a motion compensation unit. Video decoder 30 may, in some examples, perform a decoding pass generally reciprocal to the encoding pass described with respect to video encoder 20 of FIG. 2.

As explained with regard to the encoder 20, the inverse quantization unit 210, the inverse transform processing unit 212, the reconstruction unit 214, the loop filter 220, the decoded picture buffer (DPB) 230, the inter-prediction unit 244 and the intra-prediction unit 254 are also referred to as forming the "built-in decoder" of video encoder 20. Accordingly, the inverse quantization unit 310 may be identical in function to the inverse quantization unit 210, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters 366, such as any or all of inter-prediction parameters (e.g. reference picture index and motion vector), intra-prediction parameters (e.g. intra-prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter-prediction parameters, intra-prediction parameters and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general, information related to the inverse quantization) and quantized coefficients from the encoded picture data 21 (e.g. by parsing and/or decoding, e.g. by entropy decoding unit 304) and to apply, based on the quantization parameters, an inverse quantization to the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 313 in the sample domain. The reconstructed residual blocks 313 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may comprise a deblocking filter, an SAO filter and an ALF filter. The order of the filtering process may be the deblocking filter, SAO and ALF. In another example, a process called luma mapping with chroma scaling (LMCS) (namely, the adaptive in-loop reshaper) is added. This process is performed before deblocking. In another example, the deblocking filter process may be also applied to internal sub-block edges, e.g. affine sub-block edges, ATMVP sub-block edges, sub-block transform (SBT) edges and intra sub-partition (ISP) edges. Although the loop filter unit 320 is shown in FIG. 3 as being an in-loop filter, in other configurations, the loop filter unit 320 may be implemented as a post loop filter.

Decoded Picture Buffer

The decoded video blocks 321 of a picture are then stored in the decoded picture buffer 330, which stores the decoded pictures 331 as reference pictures for subsequent motion compensation for other pictures and/or for output or respectively display.

The decoder 30 is configured to output the decoded picture 311, e.g. via output 312, for presentation or viewing to a user.

Prediction

The inter-prediction unit 344 may be identical to the inter-prediction unit 244 (in particular, to the motion compensation unit) and the intra-prediction unit 354 may be identical to the intra-prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra- or inter-prediction) per block based on reconstructed pictures, blocks or respective samples (filtered or unfiltered) to obtain the prediction block 365.

When the video slice or picture is coded as an intra-coded (I) slice, intra-prediction unit 354 of mode application unit 360 is configured to generate prediction block 365 for a picture block of the current video slice based on a signaled intra-prediction mode and data from previously decoded blocks of the current picture. When the video slice or picture is coded as an inter-coded (i.e., B, or P) slice, inter-prediction unit 344 (e.g. motion compensation unit) of mode application unit 360 is configured to produce prediction block 365 for a video block of the current video slice based on the motion vectors and other syntax elements received from entropy decoding unit 304. For inter-prediction, the prediction blocks may be produced from one of the reference pictures within one of the reference picture lists. Video decoder 30 may construct the reference picture lists, List 0 and List 1, using default construction techniques based on reference pictures stored in DPB 330. The same or similar approach may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video/picture block of the current video slice by parsing the motion vectors or related information and other syntax elements, and use the prediction information to produce the prediction blocks for the current video block being decoded. For example, the mode application unit 360 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-coded video block of the slice, inter-prediction status for each inter-coded video block of the slice, and other information to decode the video blocks in the current video slice. The same or similar approach may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video decoder 30 as shown in FIG. 3 may be configured to partition and/or decode the picture by using slices/tile groups (also referred to as video tile groups) and/or tiles (also referred to as video tiles), wherein a picture may be partitioned into or decoded using one or more slices/tile groups (typically non-overlapping), and each slice/tile group may comprise one or more blocks (e.g. CTUs) or one or more tiles, wherein each tile may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

Figure 4:
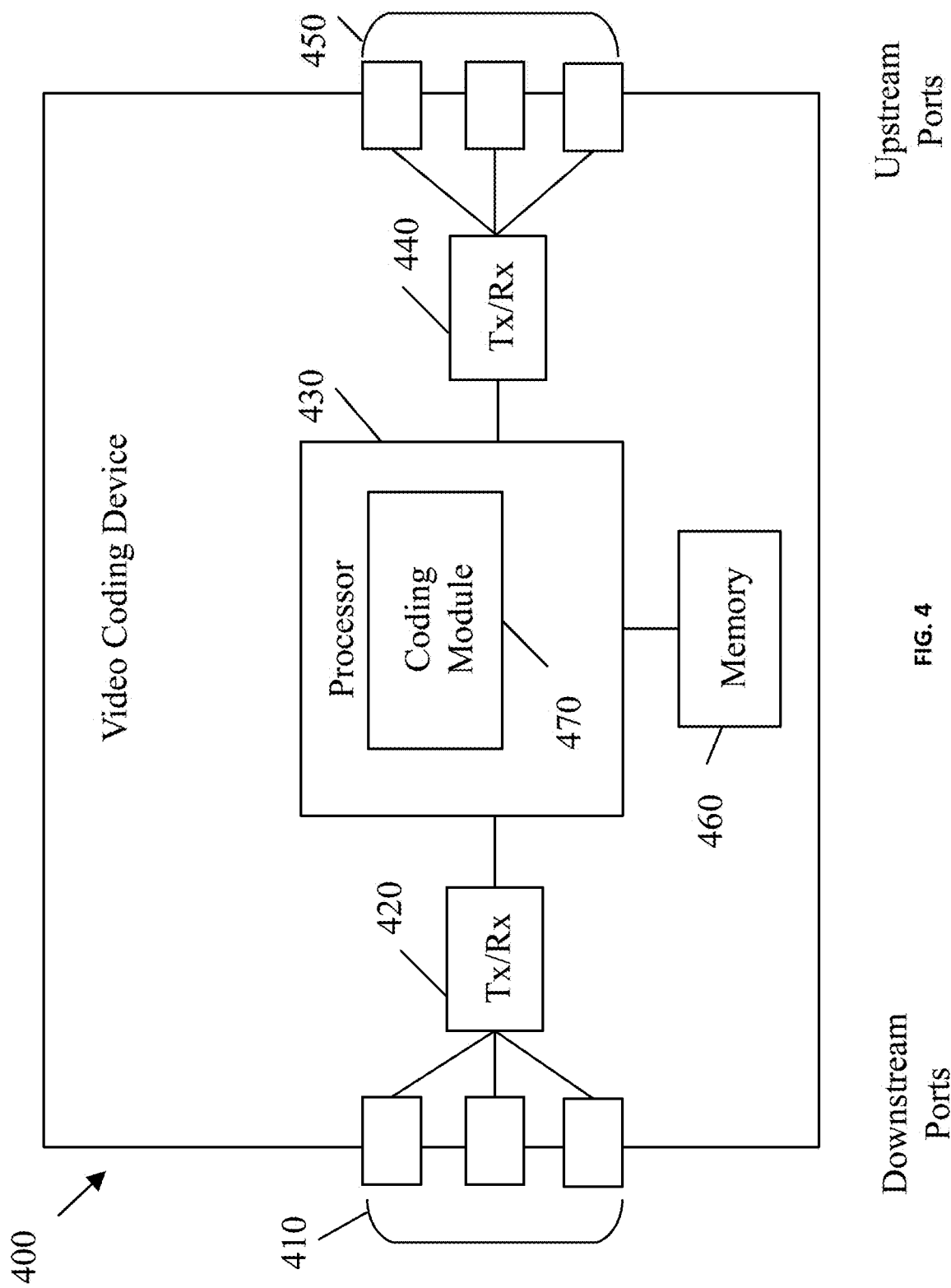
FIG. 4 is a block diagram illustrating an example of an encoding apparatus or a decoding apparatus.

FIG. 4 is a schematic diagram of a video coding device 400 according to an embodiment of the present disclosure. The video coding device 400 is suitable for implementing the disclosed embodiments as described below. In an embodiment, the video coding device 400 may be a decoder such as video decoder 30 of FIG. 1A or an encoder such as video encoder 20 of FIG. 1A.

The video coding device 400 may comprise ingress ports 410 (or input ports 410) and one or more receiver units (Rx) 420 for receiving data; a processor, logic unit, or central processing unit (CPU) 430 to process the data; one or more transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 may be implemented by hardware and software. The processor 430 may be implemented as one or more CPU chips, cores (e.g., as a multi-core processor), FPGAs, ASICs, and DSPs. The processor 430 may be in communication with the ingress ports 410, the receiver units 420, the transmitter units 440, egress ports 450, and the memory 460. The processor 430 may comprise a coding module 470. The coding module 470 implements the disclosed embodiments described above and below. For instance, the coding module 470 may implement, process, prepare, or provide the various coding operations. The inclusion of the coding module 470 therefore provides a substantial improvement to the functionality of the video coding device 400 and effects a transformation of the video coding device 400 to a different state. Alternatively, the coding module 470 may be implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
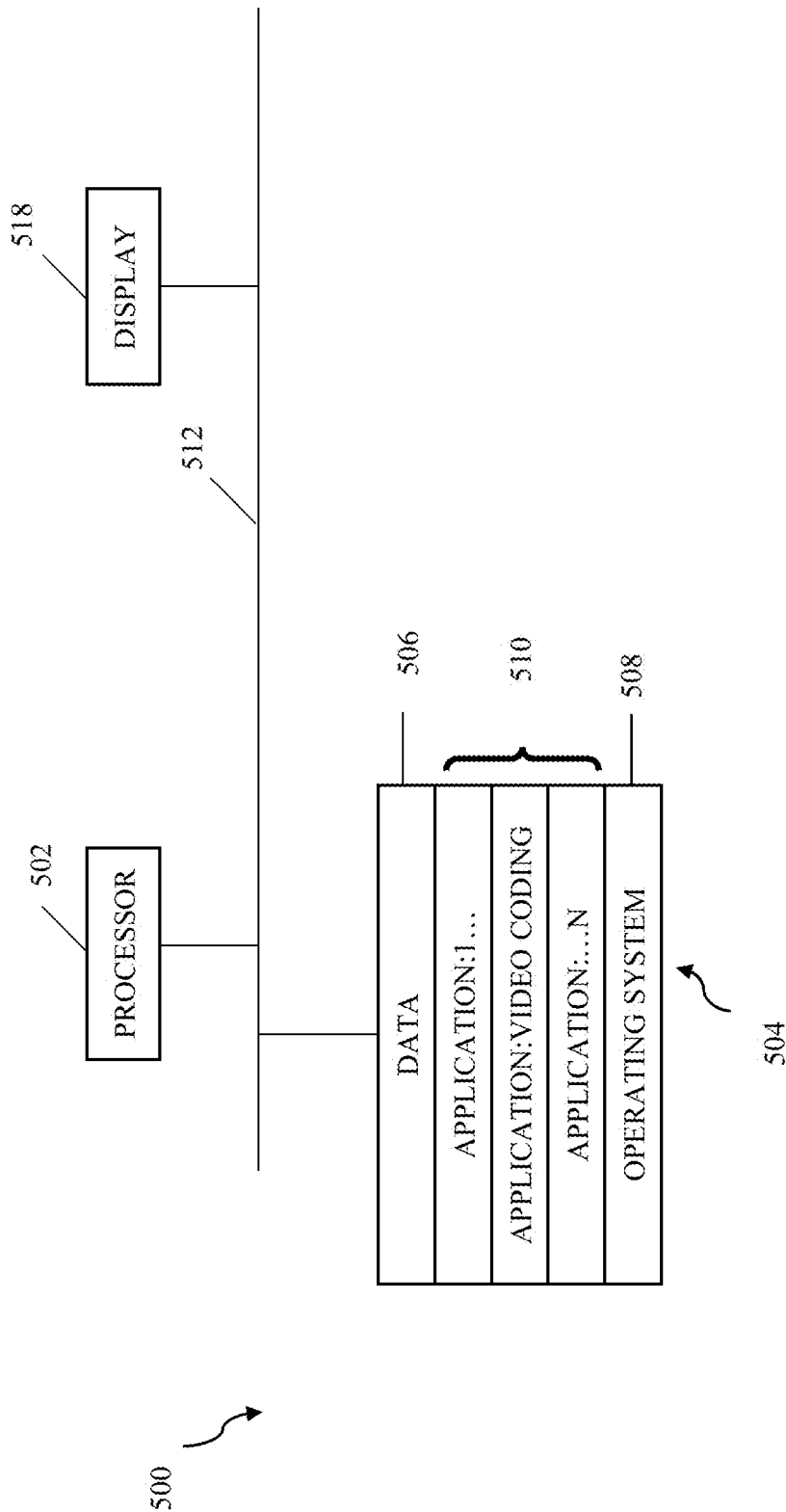
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1A according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described herein. For example, the application programs 510 can include applications 1 through N, which further include a video coding application that performs the methods described herein.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, a secondary storage (not shown) can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Non-Linear Adaptive Loop Filter

The present disclosure provides various improvements of the non-linear adaptive loop filter (ALF) as described in JVET-M0385 which is publicly available under http://phenix.it-sudparis.eu/jvet/. As described in the introductory section of the present disclosure, the non-linear ALF may be implemented in the loop filter unit 220 of the encoder 20 shown in FIG. 2 and correspondingly the loop filter unit 320 of the decoder 30 shown in FIG. 3. The non-linear ALF may perform filtering on a reconstructed frame before using this frame for prediction.

Figure 8:
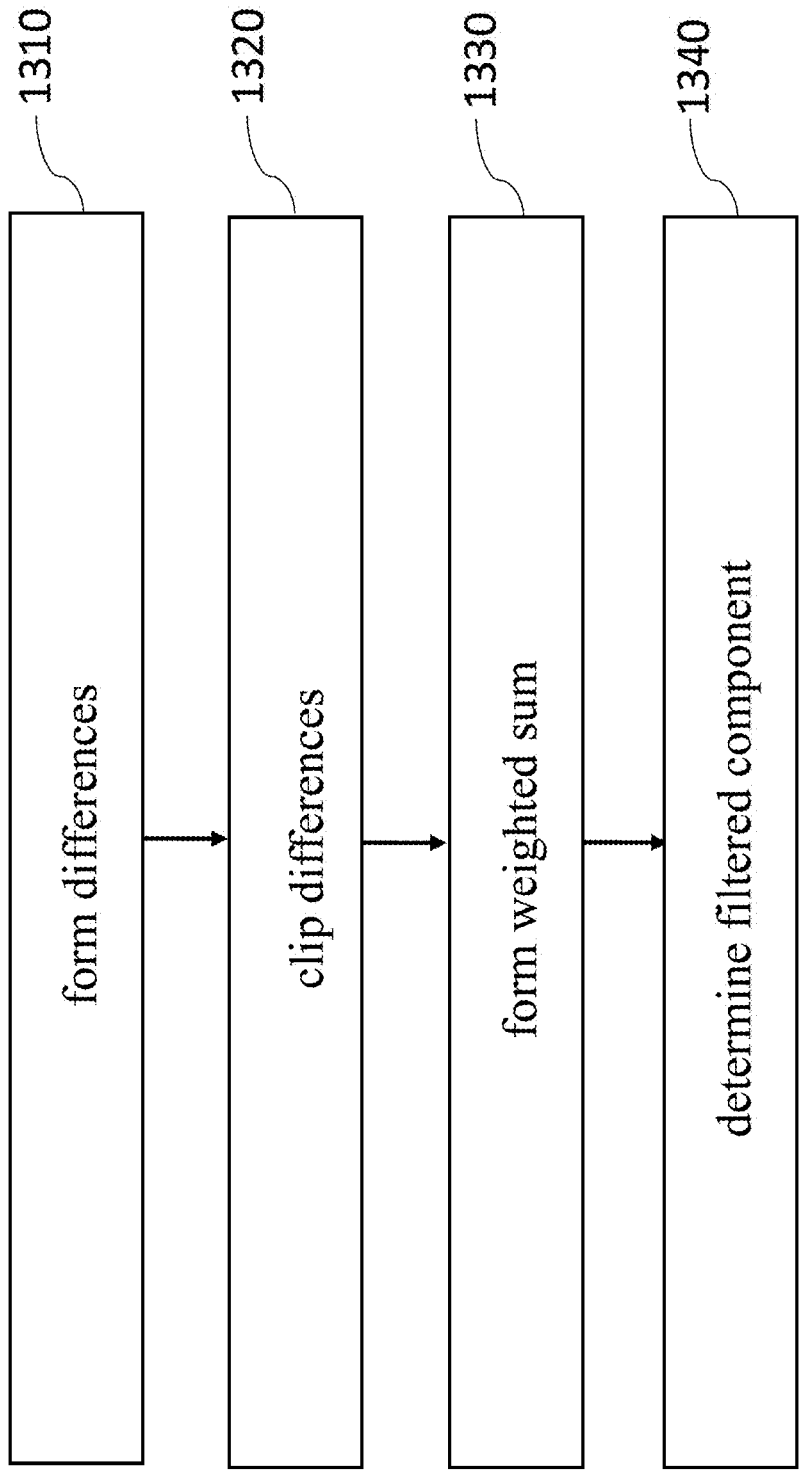
FIG. 8 shows a flowchart for a method of video encoding/decoding according to an embodiment of the disclosure.

In general, methods for in-loop filtering by performing adaptive loop filtering on a reconstructed frame of a video stream, implemented by an encoding device or a decoding device, according to the present disclosure may be implemented by the following operations as shown in FIG. 8:

Operation 1310: forming/determining differences between at least one of luma and chroma components of a pixel of the reconstructed frame and the at least one of luma and chroma components of neighboring pixels in a connected area of the pixel. The connected area of the pixel is generally defined as a set of neighboring pixels of that pixel. The set may be symmetrically arranged around the pixel wherein modifications may be applied near a boundary of the reconstructed frame or a boundary of a reconstructed block. Frequently used sets may have the shape of a diamond such as a 7×7 diamond shape for the luma component or a 5×5 diamond shape for the chroma components. The in-loop filtering may be performed separately on the luma and chroma components of a reconstructed frame. The differences entering the respective filtering processes are determined between the respective components of the pixels. In other words, differences between the luma components of the pixels are determined to perform non-linear ALF filtering on the luma component. Likewise, for each chroma component, differences between the respective chroma components of the pixels are determined to perform non-linear ALF filtering on the respective chroma component.

Operation 1320: clipping the differences according to respective clipping levels. Each neighboring pixel, and thus each difference, may have its own clipping level. In other words, the clipping levels may depend on the offset (i,j) of the respective neighboring pixel with respect to the coordinates (x,y) of the pixel to be filtered.

Operation 1330: forming/determining a weighted sum of the clipped differences. The weighting coefficients may be defined separately for each difference. In other words, the weighting coefficients or weights may depend on the offset (i,j) of the respective neighboring pixel with respect to the coordinates (x,y) of the pixel to be filtered.

Operation 1340: determine the filtered respective component of the pixel, i.e. the luma component or the respective chroma component, by adding the weighted sum to the at least one of luma and chroma components of the pixel.

According to an aspect of the present disclosure, the respective clipping levels may be chosen from a same set of possible clipping levels for the luma and chroma components. In other words, a single set of clipping levels may be provided from which all of the clipping levels used in the above described methods are taken. While different clipping levels may be applied for luma and chroma components, in particular according to different bit depths of the luma and chroma components, the same set of possible clipping levels is provided for all components. This approach provides a consistent clipping for RGB coding of the video too.

The set of possible clipping levels may be pre-defined or determined according to one or more pre-defined formulas. The set of possible clipping levels may be pre-defined in the form of a table, in particular a look-up table (LUT). The set of possible clipping levels, and in particular the LUT, may be determined as a result of one or more parametric formulas. In other words, one or more formulas with parameters may be used to determine the set of possible clipping values. The parameters may include a bit depth and an index. Through variation of the parameters, the set of possible clipping values may be determined in the form of a table with the parameters indicating the lines and columns of the table.

This present disclosure further provides simplifications of the non-linear adaptive loop filter adopted to VVC Test Model 5.0 (VTM5.0) where an adaptive clipping operation is applied during the filtering process. For the worst case scenario, the non-linear adaptive loop filter requires 12 multiplications of an 8-bit filter coefficient by a (BitDepth+3)-bit value that equals to sum of clipped differences between a filtering sample and a neighboring sample.

The method according to an embodiment of the present disclosure modifies the formula of the clipping value calculation and applies a secondary clipping to guarantee the bit depth of the multiplication operand after summation. The method allows saving 2 bits of multiplication bit depth from 8×(BitDepth+3) to 8×(BitDepth+1) for each of the 12 multiplications in the worst case scenario. As described above, the same clipping level equation/formula for luma and chroma components may be used to unify the calculation. The simplifications demonstrate negligible performance change, namely: 0.00%/−0.02%/−0.01% and 0.02%/−0.04%/−0.04% (Y/Cb/Cr) in All-Intra (AI) and Random-Access (RA) configurations correspondingly.

This present disclosure broadly provides three aspects for simplification of the non-linear part of the adaptive loop filter (ALF):
1. Modify the clipping level formula to ensure clipped differences are in 11 bit range.
2. Apply secondary clipping to ensure sum of clipped differences is still in 11 bit range.
3. Use same set of possible clipping levels, in particular same formula for luma and chroma clipping value calculation.

These modifications allow reducing the filtering multiplication bit depth from 8×(BitDepth+3) to 8×(BitDepth+1) for each of the 12 multiplications that saves HardWare square area.

Aspect 1: Modify Clipping Value Calculation Formula

As a first aspect of the present disclosure, it is proposed to modify the formula of the clipping value calculation to ensure that the output after clipping by negative and positive value of Lim(i,j) is in 11 bit range (for internal BitDepth of 10 bit). An exemplary set of formulas for the clipping levels for luma and chroma components may be:

$$Lim(i, j) = 2^{BitDepthLuma * \frac{[4-Idx(i,j)]}{4}} - 1, \text{ for luma filtering}$$

$$Lim(i, j) = 2^{(BitDepthChroma-8)+8*\frac{[3-Idx(i,j)]}{3}} - 1, \text{ for chroma filtering}$$

$$Idx(i, j) = 0, 1, 2, 3$$

According to the formula, the maximum clipping level is achieved at Idx=0. Supposing BitDepthLuma=10, the maximum clipping value is $Lim(i,j)=2^{BitDepthLuma}-1=2^{10}-1=1023$. That fits into 10 bits for positive value, and would require 11 bits if also negative clipping values are considered.

Other values, in particular fractional values, are possible for Idx.

The following modifications in the VVC specification text may be implemented:

AlfClip$_L$[adaptation_parameter_set_id][filtIdx][j]=filterClips[alf_luma_coeff_delta_idx[filtIdx]][j] filterClips[sfIdx][j]=Round $(2^{(BitDepthY*(4-alf\_luma\_clip\_idx[sfIdx][j])/4)}-1)$

. . .

AlfClip$_C$[adaptation_parameter_set_id][j]=Round $(2^{(BitDepthC-8)}*2^{(8*(3-alf\_chroma\_clip\_idx[j])/3)}-1)$ Alternative implementations are possible, in particular based on different formulas as described below in more detail. The set of possible clipping levels for the two parameters BitDepth and Idx may be provided in the form of a table. Different values of BitDepth may be associated with different lines in the table. Different values of Idx may be associated with different columns in the table. Alternatively to determining the table based on a calculation of its entries using one of the formulas described in the present disclosure, the table may be pre-defined as also described in the following.

The modifications save 1 bit of filtering multiplication bit depth.

Aspect 2: Secondary Clipping

According to a second aspect, it is proposed to add a secondary clipping of the sum of clipped differences between filtering sample, i.e. the sample to be filtered, and neighbor sample to ensure the sum of clipped differences is still in 11 bit range (for internal BitDepth of 10 bit):

$$O'(x, y) = I(x, y) + \sum_{(i,j) \neq (0,0)} w(i, j) \times Clip\{Clip[\Delta(x, y, i, j),$$

$$Lim(i, j)] + Clip[\Delta(x, y, -i, -j), Lim(i, j)], Thr\}$$

$$Clip(d, b) = \min(b, \max(-b, d))$$

$$\Delta(x, y, i, j) = I(x+i, y+j) - I(x, y)$$

$$Thr = 2^{BitDepthLuma} - 1 \text{ for luma filtering}$$

$$Thr = 2^{BitDepthChroma} - 1 \text{ for chroma filtering}$$

wherein Thr is the clipping level for the secondary clipping.

A possible modification of the VVC specification implementing the above equations may be as follows:

$Thr_L = (1 << BitDepth_Y) - 1$ $sum = f[idx[0]] * Clip3(-Thr_L,$ $Thr_L, Clip3(-c[idx[0]], c[idx[0]], recPicture_L[h_x, v_{y+r3}] - curr) + Clip3(-c[idx[0]], c[idx[0]], recPicture_L [h_x, v_{y-r3}] - curr)) + f[idx[1]] * Clip3(-Thr_L,$ $Thr_L, Clip3(-c[idx[1]], c[idx[1]], recPicture_L [h_{x+1}, v_{y+r2}] - curr) + Clip3(-c[idx[1]], c[idx[1]], recPicture_L[h_{x-1}, v_{y-r2}] - curr)) + f[idx[2]] * Clip3(-Thr_L,$ $Thr_L, Clip3(-c[idx[2]], c[idx[2]], recPicture_L[h_x, v_{y+r2}] - curr) + Clip3(-c[idx[2]], c[idx[2]], recPicture_L [h_x, v_{y-r2}] - curr)) + f[idx[3]] * Clip3(-Thr_L,$ $Thr_L, (Clip3(-c[idx[3]], c[idx[3]], recPicture_L [h_{x-1}, v_{y+r2}] - curr) + Clip3(-c[idx[3]], c[idx[3]], recPicture_L[h_{x+1}, v_{y-r2}] - curr)) + f[idx[4]] * Clip3(-Thr_L,$ $Thr_L, Clip3(-c[idx[4]], c[idx[4]], recPicture_L [h_{x+2}, v_{y+r1}] - curr) + Clip3(-c[idx[4]], c[idx[4]], recPicture_L[h_{x-2}, v_{y-r1}] - curr)) + f[idx[5]] * Clip3(-Thr_L,$ $Thr_L, Clip3(-c[idx[5]], c[idx[5]], recPicture_L [h_{x+1}, v_{y+r1}] - curr) + Clip3(-c[idx[5]], c[idx[5]], recPicture_L[h_{x-1}, v_{y-r1}] - curr)) + f[idx[6]] * Clip3(-Thr_L,$ $Thr_L, Clip3(-c[idx[6]], c[idx[6]], recPicture_L[h_x, v_{y+r1}] - curr) + Clip3(-c[idx[6]], c[idx[6]], recPicture_L [h_x, v_{y-r1}] - curr)) + f[idx[7]] * Clip3(-Thr_L,$ $Thr_L, Clip3(-c[idx[7]], c[idx[7]], recPicture_L [h_{x-1}, v_{y+r1}] - curr) + Clip3(-c[idx[7]], c[idx[7]], recPicture_L[h_{x+1}, v_{y-r1}] - curr)) + f[idx[8]] * Clip3(-Thr_L,$ $Thr_L, Clip3(-c[idx[8]], c[idx[8]], recPicture_L [h_{x-2}, v_{y+r1}] - curr) + Clip3(-c[idx[8]], c[idx[8]], recPicture_L[h_{x+2}, v_{y-r1}] - curr)) + f[idx[9]] * Clip3(-Thr_L,$ $Thr_L, Clip3(-c[idx[9]], c[idx[9]], recPicture_L[h_{x+3}, v_y] - curr) + Clip3(-c[idx[9]], c[idx[9]], recPicture_L [h_{x-3}, v_y] - curr)) + f[idx[10]] * Clip3(-Thr_L,$ $Thr_L, Clip3(-c[idx[10]], c[idx[10]], recPicture_L [h_{x+2}, v_y] - curr) + Clip3(-c[idx[10]], c[idx[10]], recPicture_L[h_{x-2}, v_y] - curr)) + f[idx[11]] * Clip3(-Thr_L,$ $Thr_L, Clip3(-c[idx[11]], c[idx[11]], recPicture_L [h_{x+1}, v_y] - curr) + Clip3(-c[idx[11]], c[idx[11]], recPicture_L[h_{x-1}, v_y] - curr)$ with $Thr_L$ indicating the clipping level for the secondary clipping for the luma component.
And for chroma components:

$Thr_C = (1 << BitDepth_C) - 1$ $sum = f[0] * Clip3(-Thr_C, Thr_C, Clip3(-c[0], c[0], recPicture[h_x, v_{y+r2}] - curr) + Clip3(-c[0], c[0], recPicture [h_x, v_{y-r2}] - curr)) + f[1] * Clip3(-Thr_C,$ $Thr_C, Clip3(-c[1], c[1], recPicture[h_{x+1}, v_{y+r1}] - curr) + Clip3(-c[1], c[1], recPicture[h_{x-1}, v_{y-r1}] - curr)) + f[2] * Clip3(-Thr_C, Thr_C, Clip3(-c[2], c[2], recPicture [h_x, v_{y+r1}] - curr) + Clip3(-c[2], c[2], recPicture [h_x, v_{y-r1}] - curr)) + f[3] * Clip3(-Thr_C,$ $Thr_C, Clip3(-c[3], c[3], recPicture[h_{x-1}, v_{y+r1}] - curr) + Clip3(-c[3], c[3], recPicture[h_{x+1}, v_{y-r1}] - curr)) + f[4] * Clip3(-Thr_C, Thr_C, Clip3(-c[4], c[4], recPicture [h_{x+2}, v_y] - curr) + Clip3(-c[4], c[4], recPicture [h_{x-2}, v_y] - curr)) + f[5] * Clip3(-Thr_C, Thr_C, Clip3(-c[5], c[5], recPicture[h_{x+1}, v_y] - curr) + Clip3(-c[5], c[5], recPicture[h_{x-1}, v_y] - curr))$ This modification additionally saves 1 bit of filtering multiplication bit depth.

Aspect 3: Use the Same Formula for Luma and Chroma Clipping Value Calculation

According to the third aspect, it is proposed to use the same formula for clipping value calculation both for luma and chroma:

$$Lim(i, j) = 2^{BitDepthLuma * \frac{[4-Idx(i,j)]}{4}} - 1, \text{ for luma filtering}$$

$$Lim(i, j) = 2^{BitDepthChroma * \frac{[4-Idx(i,j)]}{4}} - 1, \text{ for chroma filtering}$$

Figure 6:
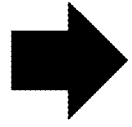
FIG. 6 is a schematic diagram illustrating a change in the clipping levels in respect to the state of the art.

The following changes in VVC specification may be implemented:

$AlfClip_L[\text{adaptation\_parameter\_set\_id}][\textit{filtIdx}][j] =$ $\text{filterClips}[\text{alf\_luma\_coeff\_delta\_idx}[\textit{filtIdx}]][j]$ $\text{filterClips}[\textit{sfIdx}][j] = \text{Round}(2^{(BitDepthY * (4-alf\_luma\_clip\_idx[sfIdx][j])/4)} - 1) \ldots$ $AlfClip_C[\text{adaptation\_parameter\_set\_id}][j] =$ $\text{Round}(2^{(BitDepthC * (4-alf\_luma\_clip\_idx[j])/4)} - 1)$ FIG. 6 is a schematic diagram illustrating the above-described exemplary change in the clipping levels in respect to the state of the art. The clipping levels $AlfClip_L$[adaptation_arameter_set_id][filtIdx][j] and $AlfClip_C$[adaptation_parameter_set_id][j] for the luma and chroma components according to this aspect of the present disclosure are determined using the same formula wherein the bit depth (BitDepthY and BitDepthC) and a clipping index (alf_luma_clip_idx and alf_chroma_clip_idx) are the parameters that determine the possible clipping levels. Consequently, the set of possible clipping levels may be provided in the form of a table, such as a look-up table, wherein the entries in the table may be generated according to the above mentioned formulas. The clipping index (alf_luma_clip_idx and alf_chroma_clip_idx) depends on sfIdx and j and therefore on the offset (i,j) of the respective neighboring pixel. It is understood that alternative formulas may be used to determine the clipping levels, in particular the set of possible clipping levels. In particular, the subtraction of 1 implementing aspect 1 as described above may be omitted.

FIG. 7 is a schematic diagram illustrating the above-described exemplary change in the clipping levels in respect to the state of the art in mathematical terms. The same formulas are used for the determination of the clipping levels for luma and chroma components. As a result, only a single set of possible clipping levels is used for both, luma and chroma components wherein the respective bit depth and a clipping index may be used as parameters pointing at the respectively applied clipping level. In other words, while the actually applied clipping levels depend on the bit depth of the respective component and an index, that may itself depend on the offset (i,j) of the neighboring pixel, the clipping levels are taken from the same set of possible clipping levels that is defined by the range of possible bit depths for the components and the range of the index. Thus, the same clipping level will be applied to luma and chroma components for identical bit depths and neighboring pixel. Using the same set of possible clipping levels for luma and chroma components make the filtering process consistent with RGB coding.

Generally, a single set of possible clipping levels may be used for luma and chroma components. The clipping levels may be determined using the same formula for luma and chroma components, as indicated above. The calculation results in a set of possible clipping levels with BitDepth-Luma/BitDepthChroma and Idx representing the parameters which determine the set of possible clipping levels. As the set is determined on the basis of two parameters, it can be represented by a table. As mentioned above, lines in the table may be associated with different values of BitDepthLuma/BitDepthChroma while columns may be associated with different values of the index Idx.

The entries in the table may be calculated starting from sets of allowed values for BitDepthLuma/BitDepthChroma and Idx according to the above formula or any of the formulas described in the following. Alternatively, the table may be pre-defined.

The third aspect brings an additional simplification due to unification of the clipping values or clipping levels, in particular their calculation, for luma and chroma components.

According to this aspect (luma/chroma harmonization), in another implementation, a table may be used instead of the formula. This may also be combined with the first aspect (10 bit bit depth in clipping formula) as described below.

To avoid a floating point operation in the calculation of the clipping levels according to some of the embodiments of the present disclosure, a table definition may be used instead, which in an exemplary embodiment for bit depths 8, 9, 10, . . . 16 and 4 clipping indices Idx specifies integer outputs (4×9=36 entries). According to the third aspect, the same table may be used for luma and chroma components, and may in particular be calculated using the following luma formula:

$$\text{filterClips}[sfIdx][j] = \text{Round}(2^{(BitDepthY*(4-alf\_luma\_clip\_idx[sfIdx][j])/4)}).$$

In VTM-5.0, clipping values of adaptive loop filter are calculated with floating-point arithmetic operations. In the present disclosure, the calculation of clipping values may be simplified by using integer operations. Compared to VTM-5.0, the disclosed methods achieve similar coding efficiency and encoding/decoding time under common test conditions.

As already described above, the in-loop filter 320, 220 is configured to process a reconstructed frame from a decoded reconstructed video stream for generating a filtered reconstructed frame.

FIG. 8 shows a flowchart for a method of video encoding/decoding according to an embodiment of the disclosure. The illustrated method performs in-loop filtering by performing adaptive loop filtering on a reconstructed frame of a video stream as follows: In operation 1310, differences between at least one of luma and chroma components of a pixel of the reconstructed frame and the at least one of luma and chroma components of neighboring pixels in a connected area of the pixel are determined. In operation 1320, the determined differences are clipped according to respective clipping levels. In operation 1330, a weighted sum of the clipped differences is formed. Finally, in operation 1340, the weighted sum is added to the at least one of luma and chroma components of the pixel to determine a filtered respective component of the pixel. The respective clipping levels are chosen from a same set of possible clipping levels for the luma and chroma components.

Figure 9:
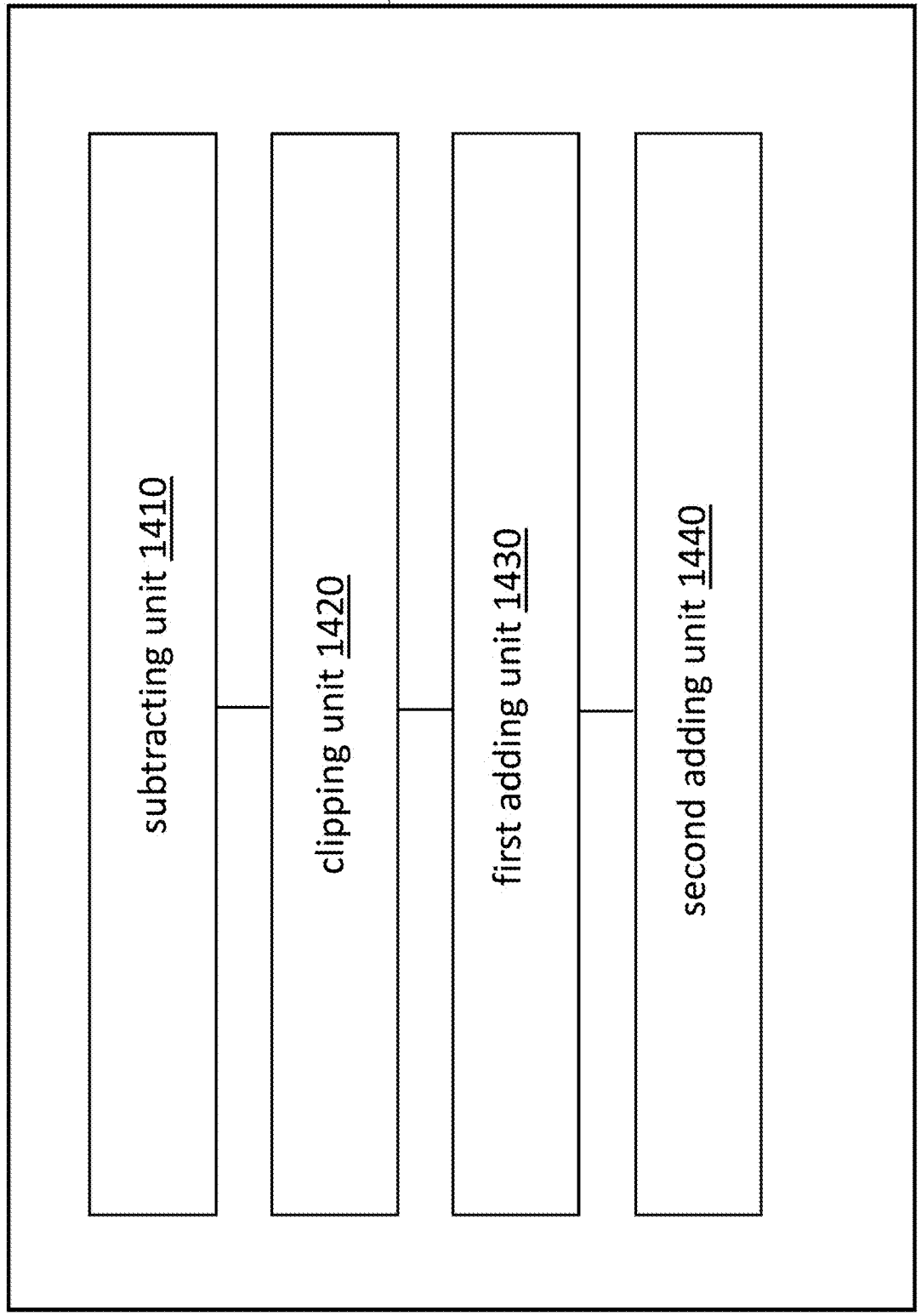
FIG. 9 shows a block diagram illustrating an example of an encoding/decoding apparatus according to an embodiment of the disclosure.

FIG. 9 shows a block diagram illustrating an example of an encoding/decoding apparatus according to an embodiment of the disclosure. The encoding/decoding apparatus 20/30 comprises a subtracting unit 1410 configured to form differences between at least one of luma and chroma components of a pixel of the reconstructed frame and the at least one of luma and chroma components of neighboring pixels in a connected area of the pixel, a clipping unit 1420 configured to clip the differences according to respective clipping levels, a first adding unit 1430 configured to form a weighted sum of the clipped differences, and a second adding unit 1440 configured to add the weighted sum to the at least one of luma and chroma components of the pixel to determine a filtered respective component of the pixel, wherein the respective clipping levels are chosen from a same set of possible clipping levels for the luma and chroma components.

The adding units 1430 and 1440, the subtracting unit 1410, and the clipping unit 1420 may be implemented in hardware, software, firmware, or any combination thereof. If implemented in software, the functions may be stored on a computer-readable medium or transmitted over communication media as one or more instructions or code and executed by a hardware-based processing unit. Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The present disclosure provides the following implementations of a non-linear ALF according to one or more of the above-described aspects.

In the following embodiments and implementations, the limiting value m for the range of indices Idx(i,j) can be set to 3.

According to a first implementation, a reconstructed frame (such as each reconstructed frame) is divided into a set of blocks (super-pixels) and each block is filtered by the adaptive loop filter in that each pixel of the filtered reconstructed frame is a weighted sum of several pixels in the connected area of the pixel from the reconstructed frame around the position of the generated filtered pixel according to the following equations:

$$O'(x, y) = I(x, y) + \sum_{(i,j)\neq(0,0)} w(i, j) \times \{\text{Clip}[\Delta(x, y, i, j),$$

$$\text{Lim}(i, j)] + \text{Clip}[\Delta(x, y, -i, -j), \text{Lim}(i, j)]\}$$

$$\Delta(x, y, i, j) = I(x+i, y+j) - I(x, y)$$

$$\text{Clip}(d, b) = \min(b, \max(-b, d))$$

-continued $$\mathrm{Lim}(i, j) = 2^{BitDepthLuma * \frac{[4-Idx(i,j)]}{4}} - 1 \text{ for luma filtering}$$

$$\mathrm{Lim}(i, j) = 2^{(BitDepthChroma-8)+8*\frac{[3-Idx(i,j)]}{3}} - 1 \text{ for chroma filtering}$$

wherein Idx(i,j) can be chosen from a range of positive values from 0 to m, where m is a positive integer value, such as Idx(i,j)=0, 1, 2 or m Here, I(x+i,y+j) are positive BitDepthLuma-bit values for luma components or BitDepthChroma-bit values for chroma components corresponding to the pixel value (or pixel brightness) in the point with coordinates (x+i,y+j) in the reconstructed frame. O'(x,y) is the filtered pixel with coordinates (x,y) in the reconstructed frame, w(i,j) denotes n-bit integer filter coefficients corresponding to a pixel position with offset (i,j) in respect to the filtered pixel, Lim(i,j) are positive k-bit clipping values, k<=BitDepth, Lim(i,j)<=$2^{BitDepthLuma}$-1 for luma components and Lim(i,j)<=$2^{BitDepthChroma}$-1 for chroma components, index Idx(i,j) can be chosen from a range of positive values from 0 to m, where m is a positive integer value. Floating point values or fractional numbers may be used for Idx to generate integer-valued exponents in the above equations for the clipping levels.

According to a second implementation, clipping levels Lim(i,j) can be determined by the following same formulas for luma and chroma components:

$$\mathrm{Lim}(i, j) = 2^{BitDepthLuma * \frac{[4-Idx(i,j)]}{4}} - 1 \text{ for luma filtering}$$

$$\mathrm{Lim}(i, j) = 2^{BitDepthChroma * \frac{[4-Idx(i,j)]}{4}} - 1 \text{ for chroma filtering}$$

wherein Idx(i,j) can be chosen from a range of positive values from 0 to m, where m is a positive integer value, such as Idx(i,j)=0, 1, 2 or m Floating point values or fractional numbers may be used for Idx to generate integer-valued exponents in the above equations for the clipping levels.

According to a third implementation, for luma component filtering, if BitDepthLuma is equal to 10, then the maximal clipping level is Lim(i,j)=1023 and if BitDepthLuma is equal to 8, then the maximal clipping level is Lim(i,j)=255.

According to a fourth implementation, for chroma component filtering, if BitDepthChroma is equal to 10, then the maximal clipping level is Lim(i,j)=1023 and if BitDepthChroma is equal to 8, then the maximal clipping level is Lim(i,j)=255.

According to a fifth implementation, clipping levels Lim (i,j) can be determined by the following same formulas for luma and chroma components:

$$\mathrm{Lim}(i, j) = 2^{BitDepthLuma * \frac{[4-Idx(i,j)]}{4}} \text{ for luma filtering}$$

$$\mathrm{Lim}(i, j) = 2^{BitDepthChroma * \frac{[4-Idx(i,j)]}{4}} \text{ for chroma filtering}$$

wherein Idx(i,j) can be chosen from a range of positive values from 0 to m, where m is a positive integer value, such as Idx(i,j)=0, 1, 2 or m.

In this implementation, the clipping levels Lim(i,j) are positive k-bit clipping values, with k<BitDepth+1, Lim(i,j)<=$2^{BitDepthLuma}$ for luma components and Lim(i,j)<$2^{BitDepthChroma}$ for chroma components.

Floating point values or fractional numbers may be used for Idx to generate integer-valued exponents in the above equations for the clipping levels.

According to a sixth implementation, clipping levels Lim(i,j) can be determined by the following same formulas for luma and chroma components:

$$\mathrm{Lim}(i, j) = 2^{BitDepthLuma * \frac{[4-Idx(i,j)]}{4}} - 1 \text{ for } luma \text{ filtering}$$

$$\mathrm{Lim}(i, j) = 2^{BitDepthChroma * \frac{[4-Idx(i,j)]}{4}} - 1 \text{ for } chroma \text{ filtering}$$

$$Idx(i, j) = 0 \text{ and/or}$$

$$\mathrm{Lim}(i, j) = 2^{BitDepthLuma * \frac{[4-Idx(i,j)]}{4}} \text{ for luma filtering}$$

$$\mathrm{Lim}(i, j) = 2^{BitDepthChroma * \frac{[4-Idx(i,j)]}{4}} \text{ for chroma filtering}$$

wherein Idx(i,j) can be chosen from a range of positive values from 1 to m, where m is a positive integer value, such as Idx(i,j)=1, 2 or m.

Floating point values or fractional numbers may be used for Idx to generate integer-valued exponents in the above equations for the clipping levels.

According to a seventh implementation, clipping levels Lim(i,j) can be determined by the following formulas for luma and chroma components:

$$\mathrm{Lim}(i, j) = 2^{BitDepth * \frac{[4-Idx(i,j)]}{4}} - 1$$

$$Idx(i, j) = 0 \text{ and/or}$$

$$\mathrm{Lim}(i, j) = 2^{BitDepth * \frac{[4-Idx(i,j)]}{4}}$$

wherein Idx(i,j) can be chosen from a range of positive values from 1 to m, where m is a positive integer value, such as Idx(i,j)=1, 2 or m and where for example, BitDepth can be BitDepthLuma or BitDepthChroma.

Floating point values or fractional numbers may be used for Idx to generate integer-valued exponents in the above equations for the clipping levels.

The fifth to seventh implementations provide a single set of possible clipping levels Lim(i,j) from which the clipping level for the respective neighboring pixel with offset (i,j) is determined according to the value of BitDepthLuma/BitDepthChroma and Idx(i,j). Only one set of clipping levels is provided for both, luma and chroma components, thereby simplifying the ALF process.

According to an eight implementation, the set of possible clipping levels Lim(i,j) can be determined by a table representation according to the formulas of any one of the fifth to seventh implementation.

In the present disclosure, the clipping levels Lim(i,j) for luma and chroma component filtering may have a table representation.

In the present disclosure, the following two examples of the table representation are provided here, and it is noted that the table representation of the clipping level Lim(i,j) may include but is not limited to the following two examples of the table.

In one example, the clipping levels Lim(i,j) may be determined by using a table representation:
If idx=Idx(i,j)=0, 1, 2 or 3:
  if BitDepthLuma equal to 8, then clipping level Lim(idx)=[255, 63, 15, 3];
  if BitDepthLuma equal to 9, then clipping level Lim(idx)=[511, 107, 22, 4];
  if BitDepthLuma equal to 10, then clipping level Lim(idx)=[1023, 180, 31, 5];
  if BitDepthLuma equal to 11, then clipping level Lim(idx)=[2047, 303, 44, 6];
  if BitDepthLuma equal to 12, then clipping level Lim(idx)=[4095, 511, 63, 7];
  if BitDepthLuma equal to 13, then clipping level Lim(idx)=[8191, 860, 90, 9];
  if BitDepthLuma equal to 14, then clipping level Lim(idx)=[16383, 1447, 127, 10];
  if BitDepthLuma equal to 15, then clipping level Lim(idx)=[32767, 2434, 180, 12]; and/or
  if BitDepthLuma equal to 16, then clipping level Lim(idx)=[65535, 4095, 255, 15].

In another example, the clipping levels Lim(i,j) may be determined by using another table representation:
If idx=Idx(I,j)=0, 1, 2 or 3:
  if BitDepthLuma equal to 8, then clipping level Lim(idx)=[255, 64, 16, 4];
  if BitDepthLuma equal to 9, then clipping level Lim(idx)=[511, 108, 23, 5];
  if BitDepthLuma equal to 10, then clipping level Lim(idx)=[1023, 181, 32, 6];
  if BitDepthLuma equal to 11, then clipping level Lim(idx)=[2047, 304, 45, 7];
  if BitDepthLuma equal to 12, then clipping level Lim(idx)=[4095, 512, 64, 8];
  if BitDepthLuma equal to 13, then clipping level Lim(idx)=[8191, 861, 91, 10];
  if BitDepthLuma equal to 14, then clipping level Lim(idx)=[16383, 1448, 128, 11];
  if BitDepthLuma equal to 15, then clipping level Lim(idx)=[32767, 2435, 181, 13]; and/or
  if BitDepthLuma equal to 16, then clipping level Lim(idx)=[65535, 4096, 256, 16].

According to a ninth implementation, the above-described filtering methods of a reconstructed frame can be used on the encoder and decoder side and for luma and chroma components.

Thus, the described in-loop filter with a maximum clipping level $Lim(i,j) <= 2^{BitDepthLuma} - 1$ for luma components and $Lim(i,j) <= 2^{BitDepthChroma} - 1$ for chroma components may require for luma components N multiplications of n-bit filter coefficients by (BitDepthLuma+2)-bit values of sums of two clipped differences between the filtering pixel and a neighbor pixel in a connected area of the pixel instead of N multiplications of n-bit filter coefficients by (BitDepthLuma+3)-bit values in the state of the art solution. For chroma components, the in-loop filter may require N multiplications of n-bit filter coefficients by (BitDepthChroma+2)-bit values of sums of two clipped differences between the filtering pixel and a neighbor pixel in the connected area instead of N multiplications of n-bit filter coefficients by (BitDepthChroma-+3)-bit values in state of art solution. As in the art, the connected areas may be different for the filtering of the luma and chroma components.

Some particular embodiments are outlined in the following. In the embodiments below, a reconstructed frame is filtered by an adaptive loop filter (such as a non-linear ALF).

According to a first embodiment, the disclosure relates to an in-loop filtering apparatus for use in a video encoding apparatus or a decoding apparatus, wherein the in-loop filtering apparatus is configured for processing a reconstructed frame for generation of a filtered reconstructed frame, wherein the reconstructed frame comprises a plurality of pixels, each pixel being associated with a pixel value, wherein the in-loop filter apparatus comprises one or more processing circuitry configured to:

filter a pixel (namely a filtering pixel, such as each pixel) from the reconstructed frame, wherein a filtered pixel (such as each pixel) of the filtered reconstructed frame is a sum of the filtering pixel (such as I(x,y)) and a weighted sum (such as $\Sigma_{(i,j) \neq (0,0)} w(i,j) \times \{Clip[\Delta(x,y,i,j), Lim(i,j)] + Clip[\Delta(x,y,-i,-j), Lim(i,j)]\}$) of clipped differences between the filtering pixel and neighbor pixels, or the filtered pixel of the filtered reconstructed frame is based on the sum.

The clipping levels may be less than or equal to $2^{BitDepth} - 1$, wherein BitDepth is a bit depth of a filtering component (such as a luma component or one from two chroma components) of the pixel (such as I(x,y)) of the reconstructed frame or BitDepth is the maximal number of bits in a sample (pixel) of the respective component of the reconstructed frame.

The filtered pixel may in particular be obtained according to following equation:

$$O'(x, y) = I(x, y) + \sum_{(i,j) \neq (0,0)} w(i, j) \times$$
$$\{Clip[\Delta(x, y, i, j), Lim(i, j)] + Clip[\Delta(x, y, -i, -j), Lim(i, j)]\}$$
$$\Delta(x, y, i, j) = I(x + i, y + j) - I(x, y)$$
$$Clip(d, b) = \min(b, \max(-b, d))$$

wherein I(x+i,y+j) are positive BitDepthLuma-bit values for luma components or BitDepthChroma-bit values for chroma components corresponding to pixel value (or pixel brightness) in the point with coordinates (x+i,y+j) in the reconstructed frame, O'(x,y) is the filtered pixel with the coordinates (x,y) in the reconstructed frame, w(i,j) denotes n-bit integer filter coefficients corresponding to a pixel position with an offset (i,j) in respect to the filtered pixel, Lim(i,j) are positive clipping values (for example, Lim(i,j)=b in the equation above), $Lim(i,j) <= 2^{BitDepthLuma} - 1$ for luma components and $Lim(i,j) <= 2^{BitDepthChroma} - 1$ for chroma components.

The clipping levels (or the clipping values) Lim(i,j) may in particular be positive k-bits clipping values, wherein k<=BitDepth.

The clipping levels Lim(i,j) for luma and chroma component filtering may have a table representation, in particular in the form of a look-up table (LUT).

The clipping levels Lim(i,j) for luma and chroma component filtering may be obtained from or determined by a table representation, in particular in the form of a look-up table (LUT).

According to an implementation of the first embodiment, the clipping levels Lim(i,j) may be determined by the following formulas:

$$\text{Lim}(i, j) = 2^{BitDepthLuma * \frac{[4-Idx(i,j)]}{4}} - 1 \text{ for } luma \text{ filtering}$$

$$\text{Lim}(i, j) = 2^{(BitDepthChroma-8)+8*\frac{[3-Idx(i,j)]}{3}} - 1 \text{ for } chroma \text{ filtering}$$

wherein an index Idx(i,j) is chosen from a range of non-negative values from 0 to m, and m is larger than or equal to zero. According to an implementation, Idx(i,j)=0, 1, 2 or m.

According to an implementation of the first embodiment, the clipping levels Lim(i,j) may be determined by the following formulas:

$$\text{Lim}(i, j) = 2^{BitDepthLuma * \frac{[4-Idx(i,j)]}{4}} \text{ for } luma \text{ filtering}$$

$$\text{Lim}(i, j) = 2^{(BitDepthChroma-8)+8*\frac{[3-Idx(i,j)]}{3}} \text{ for } chroma \text{ filtering}$$

wherein an index Idx(i,j) is chosen from a range of non-negative values from 0 to m, and m is larger than or equal to zero. According to an example, Idx(i,j)=0, 1, 2 or m. In this implementation, the clipping levels Lim(i,j) are positive k-bit clipping values, with k<=BitDepth+1, Lim(ij)<=$2^{BitDepthLuma}$ for luma components and Lim(i,j)<=$2^{BitDepthChroma}$ for chroma components.

According to an implementation of the first embodiment, the clipping levels Lim(i,j) may be determined by the following formulas:

$$\text{Lim}(i, j) = 2^{BitDepthLuma * \frac{[4-Idx(i,j)]}{4} - 1} \text{ for } luma \text{ filtering}$$

$$\text{Lim}(i, j) = 2^{(BitDepthChroma-8)+8*\frac{[3-Idx(i,j)]}{3} - 1} \text{ for } chroma \text{ filtering}$$

wherein an index Idx(i,j) is chosen from a range of non-negative values from 0 to m, and m is larger than or equal to zero. According to an implementation, Idx(i,j)=0, 1, 2 or m.

According to an implementation of the first embodiment, the clipping levels Lim(i,j) may be determined by the following formulas:

$$\text{Lim}(i, j) = 2^{BitDepthLuma * \frac{[4-Idx(i,j)]}{4}} - 1 \text{ for } luma \text{ filtering}$$

$$\text{Lim}(i, j) = 2^{(BitDepthChroma-8)+8*\frac{[3-Idx(i,j)]}{3}} - 1 \text{ for } chroma \text{ filtering}$$

$Idx(i, j) = 0$ and/or $$\text{Lim}(i, j) = 2^{BitDepthLuma * \frac{[4-Idx(i,j)]}{4}} \text{ for } luma \text{ filtering}$$

$$\text{Lim}(i, j) = 2^{(BitDepthChroma-8)+8*\frac{[3-Idx(i,j)]}{3}} \text{ for } chroma \text{ filtering}$$

wherein an index Idx(i,j) is chosen from a range of non-negative values from 1 to m, and m is larger than zero. According to an implementation, Idx(i,j)=1, 2 or m.

According to an implementation of the first embodiment, the clipping levels Lim(i,j) may be determined by the following formulas:

$$\text{Lim}(i, j) = \left[1 << \left(BitDepthLuma * \frac{4-Idx(i,j)}{4}\right)\right] - 1 \text{ for } luma \text{ filtering}$$

$$\text{Lim}(i, j) = \left[1 << \left(\frac{3*BitDepthChroma - 8*Idx(i,j)}{3}\right)\right] - 1 \text{ for } chroma \text{ filtering}$$

wherein an index Idx(i,j) is chosen from a range of non-negative values from 0 to 3. According to an implementation, Idx(i,j)=0, 1, 2, 3.

According to an implementation of the first embodiment, the clipping levels Lim(i,j) may be determined by the same formulas for luma and chroma components of the filtering pixel (such as I(x,y)) of the reconstructed frame, or the same clipping levels Lim(i,j) may be applied for luma and chroma components of the filtering pixel (such as I(x,y)) of the reconstructed frame.

According to an implementation of the first embodiment, the clipping levels Lim(i,j) may be determined by the following same formulas for luma and chroma components of the filtering pixel (such as I(x,y)) of the reconstructed frame:

$$\text{Lim}(i, j) = 2^{BitDepthLuma * \frac{[4-Idx(i,j)]}{4}} - 1 \text{ for } luma \text{ filtering}$$

$$\text{Lim}(i, j) = 2^{BitDepthChroma * \frac{[4-Idx(i,j)]}{4}} - 1 \text{ for } chroma \text{ filtering}$$

wherein an index Idx(i,j) is chosen from a range of non-negative values from 0 to m, and m is larger than or equal to zero. According to an implementation, Idx(i,j)=0, 1, 2 or m.

According to an implementation of the first embodiment, the clipping levels Lim(i,j) may be determined by the following same formulas for luma and chroma components of the filtering pixel (such as I(x,y)) of the reconstructed frame:

$$\text{Lim}(i, j) = 2^{BitDepthLuma * \frac{[4-Idx(i,j)]}{4}} - 1 \text{ for } luma \text{ filtering}$$

$$\text{Lim}(i, j) = 2^{BitDepthChroma * \frac{[4-Idx(i,j)]}{4}} - 1 \text{ for } chroma \text{ filtering}$$

$Idx(i, j) = 0$, and/or $$\text{Lim}(i, j) = 2^{BitDepthLuma * \frac{[4-Idx(i,j)]}{4}} \text{ for } luma \text{ filtering}$$

$$\text{Lim}(i, j) = 2^{BitDepthChroma * \frac{[4-Idx(i,j)]}{4}} \text{ for } chroma \text{ filtering}$$

wherein an index Idx(i,j) is chosen from a range of non-negative values from 1 to m, and m is larger than zero. According to an implementation, Idx(i,j)=1, 2 or m.

According to an implementation of the first embodiment, the clipping levels Lim(i,j) may be obtained from or determined by the table representation, and the table representation may be obtained or generated according to the following same formulas for luma and chroma components:

$$\text{Lim}(i, j) = 2^{BitDepthLuma * \frac{[4-Idx(i,j)]}{4}} - 1 \text{ for } luma \text{ filtering}$$

$$\text{Lim}(i, j) = 2^{BitDepthChroma * \frac{[4-Idx(i,j)]}{4}} - 1 \text{ for } chroma \text{ filtering}$$

$$Idx(i, j) = 0, \text{ and/or}$$

$$\text{Lim}(i, j) = 2^{BitDepthLuma * \frac{[4-Idx(i,j)]}{4}} \text{ for } luma \text{ filtering}$$

$$\text{Lim}(i, j) = 2^{BitDepthChroma * \frac{[4-Idx(i,j)]}{4}} \text{ for } chroma \text{ filtering}$$

wherein an index Idx(i,j) is chosen from a range of non-negative values from 1 to m, and m is larger than zero. According to an implementation, Idx(i,j)=1, 2 or m.

According to an implementation of the first embodiment, the clipping levels Lim(i,j) may be determined by the following same formulas for luma and chroma components of the filtering pixel (such as I(x,y)) of the reconstructed frame, where BitDepth represents luma or chroma bit depth:

$$\text{Lim}(i, j) = 2^{BitDepth * \frac{[4-Idx(i,j)]}{4}} - 1$$

$$Idx(i, j) = 0, \text{ and/or}$$

$$\text{Lim}(i, j) = 2^{BitDepth * \frac{[4-Idx(i,j)]}{4}}$$

wherein an index Idx(i,j) is chosen from a range of non-negative values from 1 to m, and m is larger than zero. According to an implementation, Idx(i,j)=1, 2 or m.

According to an implementation of the first embodiment, the clipping levels Lim(i,j) may be obtained from or determined by the table representation, and the table representation may be obtained or generated according to the following same formulas for luma and chroma components, where BitDepth represents luma or chroma bit depth:

$$\text{Lim}(i, j) = 2^{BitDepth * \frac{[4-Idx(i,j)]}{4}} - 1$$

$$Idx(i, j) = 0, \text{ and/or}$$

$$\text{Lim}(i, j) = 2^{BitDepth * \frac{[4-Idx(i,j)]}{4}}$$

wherein an index Idx(i,j) is chosen from a range of non-negative values from 1 to m, and m is larger than zero. According to an implementation, Idx(i,j)=1, 2 or m.

According to an implementation of the first embodiment, the clipping levels Lim(i,j) may be determined by the following same formulas for luma and chroma components of the filtering pixel (such as I(x,y)) of the reconstructed frame, where BitDepth represents luma or chroma bit depth:

$$\text{Lim}(i, j) = \text{Round}\left(2^{BitDepth * \frac{[4-Idx(i,j)]}{4}} - 1\right)$$

$$Idx(i, j) = 0, \text{ and/or}$$

$$\text{Lim}(i, j) = \text{Round}\left(2^{BitDepth * \frac{[4-Idx(i,j)]}{4}}\right)$$

wherein an index Idx(i,j) is chosen from a range of non-negative values from 1 to m, and m is larger than zero. According to an implementation, Idx(i,j)=1, 2 or m.

According to an implementation of the first embodiment, for luma component filtering,
if BitDepthLuma equal to 10, then the maximal clipping level may be Lim(i,j)=1023, and/or
if BitDepthLuma equal to 8, then the maximal clipping level may be Lim(i,j)=255.

According to an implementation of the first embodiment, for luma component filtering,
if BitDepthLuma equal to 10, then maximal clipping level Lim(i,j)=1023, and/or
if BitDepthLuma equal to 9, then maximal clipping level Lim(i,j)=511,
if BitDepthLuma equal to 8, then maximal clipping level Lim(i,j)=255.

According to an implementation of the first embodiment, for luma component filtering,
if BitDepthLuma equal to 16, then maximal clipping level Lim(i,j)=65535;
if BitDepthLuma equal to 15, then maximal clipping level. Lim(i,j)=32767;
if BitDepthLuma equal to 14, then maximal clipping level Lim(i,j)=16383;
if BitDepthLuma equal to 13, then maximal clipping level Lim(i,j)=8191;
if BitDepthLuma equal to 12, then maximal clipping level Lim(i,j)=4095,
if BitDepthLuma equal to 11, then maximal clipping level Lim(i,j)=2047;
if BitDepthLuma equal to 10, then maximal clipping level Lim(i,j)=1023,
if BitDepthLuma equal to 9, then maximal clipping level Lim(i,j)=511, and/or.
if BitDepthLuma equal to 8, then maximal clipping level Lim(i,j)=255.

According to an implementation of the first embodiment, for chroma component filtering,
if BitDepthChroma equal to 10, then the maximal clipping level may be Lim(i,j)=1023, and/or,
if BitDepthChroma equal to 8, then the maximal clipping level may be Lim(i,j)=255.

According to an implementation of the first embodiment, for chroma component filtering,
if BitDepthChroma equal to 16, then maximal clipping level Lim(i,j)=65535;
if BitDepthChroma equal to 15, then maximal clipping level. Lim(i,j)=32767;
if BitDepthChroma equal to 14, then maximal clipping level Lim(i,j)=16383;
if BitDepthChroma equal to 13, then maximal clipping level Lim(i,j)=8191;
if BitDepthChroma equal to 12, then maximal clipping level Lim(i,j)=4095,
if BitDepthChroma equal to 11, then maximal clipping level Lim(i,j)=2047.
if BitDepthChroma equal to 10, then maximal clipping level Lim(i,j)=1023,
if BitDepthChroma equal to 9, then maximal clipping level Lim(i,j)=511, and/or
if BitDepthChroma equal to 8, then maximal clipping level Lim(i,j)=255.

According to an implementation of the first embodiment, the clipping levels Lim(i,j) may be determined by the following same formulas for luma and chroma components of the filtering pixel (such as I(x,y)) of the reconstructed frame:

Lim(i,j)=[1<<(BitDepthLuma−ShiftConst[Idx(i,j)])]−1 for luma filtering

Lim(i,j)=[1<<(BitDepthChroma−ShiftConst[Idx(i,j)])]−1 for chroma filtering

Idx(i,j)=0,1,2,3

ShiftConst[0]=0,ShiftConst[1]=3,ShiftConst[2]=6, ShiftConst[3]=8

Or

ShiftConst[0]=0,ShiftConst[1]=2,ShiftConst[2]=4, ShiftConst[3]=8.

According to an implementation of the first embodiment, the clipping levels Lim(i,j) may be chosen from the same set of possible values for luma and chroma components for the filtering pixel (such as I(x,y)) of the reconstructed frame.

According to an implementation of the first embodiment, the clipping levels Lim(i,j) may be determined by the following same formulas for luma and chroma components of the filtering pixel (such as I(x,y)) of the reconstructed frame:

$$Lim(i, j) = 2^{BitDepthLuma * \frac{[4-Idx(i,j)]}{4}} \text{ for luma filtering}$$

$$Lim(i, j) = 2^{BitDepthChroma * \frac{[4-Idx(i,j)]}{4}} \text{ for chroma filtering}$$

wherein an index Idx(i,j) is chosen from a range of non-negative values from 0 to m, and m is larger than or equal to zero. According to an example, Idx(i,j)=0, 1, 2 or m.

In this implementation, the clipping levels Lim(i,j) are positive k-bit clipping values, with k<BitDepth+1, Lim(i,j) <=$2^{BitDepthLuma}$ for luma components and Lim(i,j)<=$2^{BitDepthChroma}$ for chroma components.

According to an implementation of the first embodiment, the clipping levels (or clipping values) Lim(i,j) may be determined by the following same table representation for luma and chroma components of the reconstructed frame:
If idx=Idx(i,j)=0, 1, 2 or 3:
  if BitDepthLuma equal to 8, then clipping level Lim(idx)=[255, 63, 15, 3];
  if BitDepthLuma equal to 9, then clipping level Lim(idx)=[511, 107, 22, 4];
  if BitDepthLuma equal to 10, then clipping level Lim(idx)=[1023, 180, 31, 5];
  if BitDepthLuma equal to 11, then clipping level Lim(idx)=[2047, 303, 44, 6];
  if BitDepthLuma equal to 12, then clipping level Lim(idx)=[4095, 511, 63, 7];
  if BitDepthLuma equal to 13, then clipping level Lim(idx)=[8191, 860, 90, 9];
  if BitDepthLuma equal to 14, then clipping level Lim(idx)=[16383, 1447, 127, 10];
  if BitDepthLuma equal to 15, then clipping level Lim(idx)=[32767, 2434, 180, 12]; and/or
  if BitDepthLuma equal to 16, then clipping level Lim(idx)=[65535, 4095, 255, 15].

According to an implementation of the first embodiment, the clipping levels (or clipping values) Lim(i,j) may be determined by the following same table representation for luma and chroma components of the reconstructed frame:
If idx=Idx(i,j)=0, 1, 2 or 3:
  if BitDepthLuma equal to 8, then clipping level Lim(idx)=[255, 64, 16, 4];
  if BitDepthLuma equal to 9, then clipping level Lim(idx)=[511, 108, 23, 5];
  if BitDepthLuma equal to 10, then clipping level Lim(idx)=[1023, 181, 32, 6];
  if BitDepthLuma equal to 11, then clipping level Lim(idx)=[2047, 304, 45, 7];
  if BitDepthLuma equal to 12, then clipping level Lim(idx)=[4095, 512, 64, 8];
  if BitDepthLuma equal to 13, then clipping level Lim(idx)=[8191, 861, 91, 10];
  if BitDepthLuma equal to 14, then clipping level Lim(idx)=[16383, 1448, 128, 11];
  if BitDepthLuma equal to 15, then clipping level Lim(idx)=[32767, 2435, 181, 13]; and/or
  if BitDepthLuma equal to 16, then clipping level Lim(idx)=[65535, 4096, 256, 16].

According to an implementation of the first embodiment, for use in a video encoding apparatus or a decoding apparatus, the above-described in-loop filter may be configured for processing a current reconstructed block, wherein the current reconstructed block comprises a plurality of pixels from the reconstructed frame.

According to an implementation of the first embodiment, the in-loop filter may be applied for luma and chroma components of the reconstructed frame.

According to an implementation of the first embodiment, the filtered reconstructed frame may be usable to generate encoded video data for the video signal for transmission or storage or usable to decode the video signal for display in a display device.

According to an aspect of the first embodiment, an encoding apparatus is provided for encoding a current frame from an input video stream, wherein the encoding apparatus comprises an in-loop filter apparatus according to any one of the implementations of the first embodiment.

According to a further aspect of the first embodiment, a decoding apparatus is provided for decoding an encoded frame, wherein the decoding apparatus comprises an in-loop filter apparatus according to any one of the implementations of the first embodiment.

According to an implementation of the first embodiment, the clipping levels Lim(i,j) may be obtained from or determined by the table representation, and the same table representation may be used for luma and chroma components.

According to an implementation of the first embodiment, the clipping levels may be less or equal to $2^{BitDepth}-1$, wherein BitDepth is a bit depth of a filtering component (such as a luma component or one from two chroma components) of the pixel (such as I(x,y)) of the reconstructed frame or BitDepth is the maximal number of bits in a sample (pixel) of the respective component of the reconstructed frame.

According to a second embodiment, the disclosure relates to an in-loop filtering method for processing a reconstructed frame from a decoded video stream for generation of a filtered reconstructed frame, wherein the reconstructed frame comprises a plurality of pixels, each pixel being associated with a pixel value, wherein the in-loop filtering method comprises:
  filtering a pixel (namely a filtering pixel, such as each pixel) from the reconstructed frame, wherein a filtered pixel of the filtered reconstructed frame is a sum of the filtering pixel and a weighted sum of clipped differences between the filtering pixel and neighbor pixels, or the filtered pixel of the filtered reconstructed frame is based on the sum.

The clipping levels may be less than or equal to $2^{BitDepth}-1$, wherein BitDepth is a bit depth of a filtering component (such as a luma component or one from two chroma components) of the pixel (such as I(x,y)) of the reconstructed frame or BitDepth is the maximal number of bits in a sample (pixel) of the respective component of the reconstructed frame.

The method may in particular comprise processing a current reconstructed block, wherein the current reconstructed block comprises a plurality of pixels from the reconstructed frame.

The filtered pixel may in particular be obtained according to following equations:

$$O'(x, y) = I(x, y) + \sum_{(i,j) \neq (0,0)} w(i, j) \times$$

$$\{Clip[\Delta(x, y, i, j), Lim(i, j)] + Clip[\Delta(x, y, -i, -j), Lim(i, j)]\}$$

$$\Delta(x, y, i, j) = I(x+i, y+j) - I(x, y)$$

$$Clip(d, b) = \min(b, \max(-b, d))$$

wherein I(x+i,y+j) are positive BitDepthLuma-bit values for luma components or BitDepthChroma-bit values for chroma components corresponding to pixel values (or pixel brightness) in a point with coordinates (x+i, y+j) in the reconstructed frame, O'(x,y) is the filtered pixel with the coordinates (x,y) in the reconstructed frame, w(i,j) denotes n-bit integer filter coefficients corresponding to a pixel position with an offset (i,j) in respect to the filtered pixel, Lim(i,j) are positive clipping values. According to one specific implementation, $Lim(i,j)<=2^{BitDepthLuma}-1$ for luma components and $Lim(i,j)<=2^{BitDepthChroma}-1$ for chroma components.

In an example, the pixel brightness or pixel value may be a value which corresponds to the brightness of pixel on the screen or display. In other words, the pixel brightness is a value corresponding to the pixel.

In an example, the luma samples have picture coordinates, such as (x,y) that are the picture coordinates of the specified luma samples.

In an example, the chroma samples have picture coordinates, such as (x,y) that are the picture coordinates of the specified chroma samples.

It can be understood that before or during the filtering process, a pixel (such as I(x,y)) is understood as a to-be-filtered pixel or a filtering pixel, and after the filtering process is performed, the value of the pixel (such as I(x,y)) may be changed and may be understood as a filtered pixel(such as O'(x,y)).

The clipping levels Lim(i,j) may in particular be positive k-bit clipping values, wherein k<=BitDepth.

The clipping levels Lim(i,j) for luma and chroma component filtering may have a table representation, in particular in the form of a look-up table (LUT).

The clipping levels Lim(i,j) for luma and chroma component filtering may be obtained from or determined by a table representation, in particular in the form of a look-up table (LUT).

According to an implementation of the second embodiment, the clipping levels Lim(i,j) may in particular be determined by the following formulas:

$$Lim(i, j) = 2^{BitDepthLuma * \frac{[4-Idx(i,j)]}{4}} - 1 \text{ for luma filtering}$$

$$Lim(i, j) = 2^{(BitDepthChroma-8)+8 * \frac{[3-Idx(i,j)]}{3}} - 1 \text{ for chroma filtering}$$

wherein an index Idx(i,j) is chosen from a range of non-negative values from 0 to m, and m is larger than or equal to zero. According to an implementation, Idx(i,j)=0, 1, 2 or m.

According to an implementation of the second embodiment, the clipping levels Lim(i,j) may in particular be determined by the following formulas:

$$Lim(i, j) = 2^{BitDepthLuma * \frac{[4-Idx(i,j)]}{4}} \text{ for luma filtering}$$

$$Lim(i, j) = 2^{(BitDepthChroma-8)+8 * \frac{[3-Idx(i,j)]}{3}} \text{ for chroma filtering}$$

wherein an index Idx(i,j) is chosen from a range of non-negative values from 0 to m, and m is larger than or equal to zero. According to an example, Idx(i,j)=0, 1, 2 or m.

In this implementation, the clipping levels Lim(i,j) are positive k-bit clipping values, with k<BitDepth+1, $Lim(i,j)<=2^{BitDepthLuma}$ for luma components and $Lim(i,j)<2^{BitDepthChroma}$ for chroma components.

According to an implementation of the second embodiment, the clipping levels Lim(i,j) may in particular be determined by the following formulas:

$$Lim(i, j) = 2^{BitDepthLuma * \frac{[4-Idx(i,j)]}{4} - 1} \text{ for luma filtering}$$

$$Lim(i, j) = 2^{(BitDepthChroma-8)+8 * \frac{[3-Idx(i,j)]}{3} - 1} \text{ for chroma filtering}$$

wherein an index Idx(i,j) is chosen from a range of non-negative values from 0 to m, and m is larger than or equal to zero. According to an implementation, Idx(i,j)=0, 1, 2 or m.

According to an implementation of the second embodiment, the clipping levels Lim(i,j) or the clipping values Lim(i,j) of a table representation (such as a table or a LUT table) may be determined by the following formulas:

$$Lim(i, j) = 2^{BitDepthLuma * \frac{[4-Idx(i,j)]}{4}} - 1 \text{ for luma filtering}$$

$$Lim(i, j) = 2^{(BitDepthChroma-8)+8 * \frac{[3-Idx(i,j)]}{3}} - 1 \text{ for chroma filtering}$$

$$Idx(i, j) = 0,$$

and/or $$Lim(i, j) = 2^{BitDepthLuma * \frac{[4-Idx(i,j)]}{4}} \text{ for luma filtering}$$

$$Lim(i, j) = 2^{(BitDepthChroma-8)+8 * \frac{[3-Idx(i,j)]}{3}} \text{ for chroma filtering}$$

wherein an index Idx(i,j) is chosen from a range of non-negative values from 1 to m, and m is larger than zero. According to an implementation, Idx(i,j)=1, 2 or m.

According to an implementation of the second embodiment, the clipping levels Lim(i,j) may be determined by the following formulas:

$$\text{Lim}(i, j) = \left[1 << \left(BitDepthLuma * \frac{4 - Idx(i, j)}{4}\right)\right] - 1 \text{ for luma filtering}$$

$$\text{Lim}(i, j) = \left[1 << \left(\frac{3 * BitDepthChroma - 8 * Idx(i, j)}{3}\right)\right] - 1 \text{ for chroma filtering}$$

wherein an index Idx(i,j) is chosen from a range of non-negative values from 0 to 3. According to an implementation, Idx(i,j)=0, 1, 2, 3.

According to an implementation of the second embodiment, the clipping levels Lim(i,j) may be determined by the same formulas for luma and chroma components of the filtering pixel (such as I(x,y)) of the reconstructed frame, or the same clipping levels Lim(i,j) may be applied for luma and chroma components of the filtering pixel (such as I(x,y)) of the reconstructed frame.

According to an implementation of the second embodiment, the clipping levels Lim(i,j) may be determined by the following same formulas for luma and chroma components of the filtering pixel (such as I(x,y)) of the reconstructed frame:

$$\text{Lim}(i, j) = 2^{BitDepthLuma * \frac{[4 - Idx(i,j)]}{4}} - 1 \text{ for luma filtering}$$

$$\text{Lim}(i, j) = 2^{BitDepthChroma * \frac{[4 - Idx(i,j)]}{4}} - 1 \text{ for chroma filtering}$$

wherein an index Idx(i,j) is chosen from a range of non-negative values from 0 to m, and m is larger than or equal to zero. According to an implementation, Idx(i,j)=0, 1, 2 or m.

According to an implementation of the second embodiment, the clipping levels Lim(i,j) may be determined by the following same formulas for luma and chroma components of the filtering pixel (such as I(x,y)) of the reconstructed frame:

$$\text{Lim}(i, j) = 2^{BitDepthLuma * \frac{[4 - Idx(i,j)]}{4}} - 1 \text{ for luma filtering}$$

$$\text{Lim}(i, j) = 2^{BitDepthChroma * \frac{[4 - Idx(i,j)]}{4}} - 1 \text{ for chroma filtering}$$

$$Idx(i, j) = 0,$$

and/or $$\text{Lim}(i, j) = 2^{BitDepthLuma * \frac{[4 - Idx(i,j)]}{4}} \text{ for luma filtering}$$

$$\text{Lim}(i, j) = 2^{BitDepthChroma * \frac{[4 - Idx(i,j)]}{4}} \text{ for chroma filtering}$$

wherein an index Idx(i,j) is chosen from a range of non-negative values from 1 to m, and m is larger than zero. According to an implementation, Idx(i,j)=1, 2 or m.

According to an implementation of the second embodiment, the clipping levels Lim(i,j) may be determined by the following same formulas for luma and chroma components of the filtering pixel (such as I(x,y)) of the reconstructed frame, where BitDepth represents luma or chroma bit depth:

$$\text{Lim}(i, j) = 2^{BitDepth * \frac{[4 - Idx(i,j)]}{4}} - 1$$

$$Idx(i, j) = 0,$$

and/or $$\text{Lim}(i, j) = 2^{BitDepth * \frac{[4 - Idx(i,j)]}{4}}$$

wherein an index Idx(i,j) is chosen from a range of non-negative values from 1 to m, and m is larger than zero. According to an implementation, Idx(i,j)=1, 2 or m.

According to an implementation of the second embodiment, the clipping levels Lim(i,j) may be obtained from or determined by the table representation, and the table representation may be obtained or generated according to the following same formulas for luma and chroma components, where BitDepth represents luma or chroma bit depth:

$$\text{Lim}(i, j) = 2^{BitDepth * \frac{[4 - Idx(i,j)]}{4}} - 1$$

$$Idx(i, j) = 0,$$

and/or $$\text{Lim}(i, j) = 2^{BitDepth * \frac{[4 - Idx(i,j)]}{4}}$$

wherein an index Idx(i,j) is chosen from a range of non-negative values from 1 to m, and m is larger than zero. According to an implementation, Idx(i,j)=1, 2 or m.

According to an implementation of the second embodiment, the clipping levels Lim(i,j) may be determined by the following same formulas for luma and chroma components of the filtering pixel (such as I(x,y)) of the reconstructed frame, where BitDepth represents luma or chroma bit depth:

$$\text{Lim}(i, j) = \text{Round}\left(2^{BitDepth * \frac{[4 - Idx(i,j)]}{4}} - 1\right)$$

$$Idx(i, j) = 0,$$

and/or $$\text{Lim}(i, j) = \text{Round}\left(2^{BitDepth * \frac{[4 - Idx(i,j)]}{4}}\right)$$

wherein an index Idx(i,j) is chosen from a range of non-negative values from 1 to m, and m is larger than zero. According to an implementation, Idx(i,j)=1, 2 or m.

According to an implementation of the second embodiment, the clipping levels (or clipping values) Lim(i,j) may be determined by the following same table representation for luma and chroma components of the reconstructed frame:
If idx=Idx(i,j)=0, 1, 2 or 3:
  if BitDepthLuma equal to 8, then clipping level Lim(idx)=[255, 63, 15, 3];
  if BitDepthLuma equal to 9, then clipping level Lim(idx)=[511, 107, 22, 4];
  if BitDepthLuma equal to 10, then clipping level Lim(idx)=[1023, 180, 31, 5];
  if BitDepthLuma equal to 11, then clipping level Lim(idx)=[2047, 303, 44, 6];
  if BitDepthLuma equal to 12, then clipping level Lim(idx)=[4095, 511, 63, 7];
  if BitDepthLuma equal to 13, then clipping level Lim(idx)=[8191, 860, 90, 9];
  if BitDepthLuma equal to 14, then clipping level Lim(idx)=[16383, 1447, 127, 10];
  if BitDepthLuma equal to 15, then clipping level Lim(idx)=[32767, 2434, 180, 12]; and/or
  if BitDepthLuma equal to 16, then clipping level Lim(idx)=[65535, 4095, 255, 15].

According to an implementation of the second embodiment, the clipping levels (or clipping values) Lim(i,j) may be determined by the following same table representation for luma and chroma components of the reconstructed frame:
If idx=Idx(i,j)=0, 1, 2 or 3:
  if BitDepthLuma equal to 8, then clipping level Lim(idx)=[255, 64, 16, 4];
  if BitDepthLuma equal to 9, then clipping level Lim(idx)=[511, 108, 23, 5];
  if BitDepthLuma equal to 10, then clipping level Lim(idx)=[1023, 181, 32, 6];
  if BitDepthLuma equal to 11, then clipping level Lim(idx)=[2047, 304, 45, 7];
  if BitDepthLuma equal to 12, then clipping level Lim(idx)=[4095, 512, 64, 8];
  if BitDepthLuma equal to 13, then clipping level Lim(idx)=[8191, 861, 91, 10];
  if BitDepthLuma equal to 14, then clipping level Lim(idx)=[16383, 1448, 128, 11];
  if BitDepthLuma equal to 15, then clipping level Lim(idx)=[32767, 2435, 181, 13]; and/or
  if BitDepthLuma equal to 16, then clipping level Lim(idx)=[65535, 4096, 256, 16].

According to an implementation of the second embodiment, for luma component filtering,
  if BitDepthLuma equal to 10, then the maximal clipping level may be Lim(i,j)=1023, and/or
  if BitDepthLuma equal to 8, then the maximal clipping level may be Lim(i,j)=255.

According to an implementation of the second embodiment, for luma component filtering,
  if BitDepthLuma equal to 16, then maximal clipping level Lim (i,j)=65535;
  if BitDepthLuma equal to 15, then maximal clipping level. Lim(i,j)=32767;
  if BitDepthLuma equal to 14, then maximal clipping level Lim(i,j)=16383;
  if BitDepthLuma equal to 13, then maximal clipping level Lim(i,j)=8191;
  if BitDepthLuma equal to 12, then maximal clipping level Lim(i,j)=4095,
  if BitDepthLuma equal to 11, then maximal clipping level Lim(i,j)=2047;
  if BitDepthLuma equal to 10, then maximal clipping level Lim((i,j)=1023,
  if BitDepthLuma equal to 9, then maximal clipping level Lim(i,j)=511, and/or.
  if BitDepthLuma equal to 8, then maximal clipping level Lim(i,j)=255.

According to an implementation of the second embodiment, for chroma component filtering,
  if BitDepthChroma equal to 10, then the maximal clipping level may be Lim(i,j)=1023, and/or,
  if BitDepthChroma equal to 8, then the maximal clipping level may be Lim(i,j)=255.

According to an implementation of the second embodiment, for chroma component filtering,
  if BitDepthChroma equal to 16, then maximal clipping level Lim(i,j)=65535;
  if BitDepthChroma equal to 15, then maximal clipping level. Lim(i,j)=32767;
  if BitDepthChroma equal to 14, then maximal clipping level Lim(i,j)=16383;
  if BitDepthChroma equal to 13, then maximal clipping level Lim(i,j)=8191;
  if BitDepthChroma equal to 12, then maximal clipping level Lim(i,j)=4095,
  if BitDepthChroma equal to 11, then maximal clipping level Lim(i,j)=2047.
  if BitDepthChroma equal to 10, then maximal clipping level Lim(i,j)=1023,
  if BitDepthChroma equal to 9, then maximal clipping level Lim(i,j)=511, and/or
  if BitDepthChroma equal to 8, then maximal clipping level Lim(i,j)=255.

According to an implementation of the second embodiment, the clipping levels Lim(i,j) may be determined by the following same formulas for luma and chroma components of the filtering pixel(such as I(x,y)) of the reconstructed frame:

$$Lim(i,j)=[1<<(BitDepthLuma-ShiftConst[Idx(i,j)])]-1 \text{ for luma filtering}$$

$$Lim(i,j)=[1<<(BitDepthChroma-ShiftConst[Idx(i,j)])]-1 \text{ for chroma filtering}$$

$$Idx(i,j)=0,1,2,3$$

$$ShiftConst[0]=0, ShiftConst[1]=3, ShiftConst[2]=6, ShiftConst[3]=8$$

Or $$ShiftConst[0]=0, ShiftConst[1]=2, ShiftConst[2]=4, ShiftConst[3]=8.$$

According to an implementation of the second embodiment, the clipping levels Lim(i,j) may be determined by the following same formulas for luma and chroma components of the filtering pixel (such as I(x,y)) of the reconstructed frame:

$$Lim(i,j) = 2^{BitDepthLuma * \frac{[4-Idx(i,j)]}{4}} \text{ for luma filtering}$$

$$Lim(i,j) = 2^{BitDepthChroma * \frac{[4-Idx(i,j)]}{4}} \text{ for chroma filtering}$$

wherein an index Idx(i,j) is chosen from a range of non-negative values from 0 to m, and m is larger than or equal to zero. According to an example, Idx(i,j)=0, 1, 2 or m.

In this implementation, the clipping levels Lim(i,j) are positive k-bit clipping values, with k<BitDepth+1, Lim(i,j) $<=2^{BitDepthLuma}$ for luma components and Lim(i,j)$<=2^{BitDepthChroma}$ for chroma components.

According to an implementation of the second embodiment, a rounding procedure may be applied to the clipping values Lim(i,j) according to the following equations:

Lim(i,j)=Round(Lim(i,j))

Round(x)=Sign(x)*Floor(Abs(x)+0.5)

wherein sign(x) is sign of x, abs(x) is module of x, floor(y) is the largest integral value that is not greater than y.

According to an implementation of the second embodiment, the clipping levels Lim(i,j) may be obtained from or determined by the table representation, and the same table representation may be used for luma and chroma components.

According to an implementation of the second embodiment, the clipping levels may be less or equal to $2^{BitDepth}-1$, wherein BitDepth is a bit depth of a filtering component (such as a luma component or one from two chroma components) of the pixel (such as I(x,y)) of the reconstructed frame or BitDepth is the maximal number of bits in a sample (pixel) of the respective component of the reconstructed frame.

According to a third embodiment, the disclosure relates to an in-loop filtering apparatus for use in a video encoding apparatus or a decoding apparatus, wherein the in-loop filtering apparatus is configured for processing a reconstructed frame for generation of a filtered reconstructed frame, wherein the reconstructed frame comprises a plurality of pixels, each pixel being associated with a pixel value, wherein the in-loop filter apparatus comprises one or more processing circuitry configured to:

filter a pixel (namely a filtering pixel, such as each pixel) from the reconstructed frame, wherein a filtered pixel (such as each pixel) of the filtered reconstructed frame is obtained according to following equation:

$$O'(x, y) = I(x, y) + \sum_{(i,j) \neq (0,0)} w(i, j) \times$$

$$\{Clip[\Delta(x, y, i, j), Lim(i, j)] + Clip[\Delta(x, y, -i, -y), Lim(i, j)]\}$$

$$\Delta(x, y, i, j) = I(x + i, y + j) - I(x, y)$$

$$Clip(\Delta, Lim) = Clip3(-Lim(i, j), Lim(i, j), \Delta)$$

$$Clip3(x, y, z) = \begin{cases} x; z < x \\ y; z > y \\ z; \text{otherwise} \end{cases}$$

wherein the clipping levels (or the clipping values) Lim(i,j) or the clipping levels (or the clipping values) Lim(i,j) of a table representation (such as a table or a LUT table) are positive k-bit clipping values, (i,j) is an offset of the pixel coordinate in respect to coordinate of filtering pixel, wherein in particular, k<=BitDepth.

According to an implementation of the third embodiment, the clipping levels Lim(i,j) may be determined by the following same formulas for luma and chroma components of the filtering pixel (such as I(x,y)):

$$Lim(i, j) = 2^{BitDepthLuma * \frac{[4-Idx(i,j)]}{4}} \text{ for luma filtering}$$

$$Lim(i, j) = 2^{BitDepthChroma * \frac{[4-Idx(i,j)]}{4}} \text{ for chroma filtering}$$

wherein I(x+i,y+j) are positive BitDepthLuma-bit values for luma components or BitDepthChroma-bit values for chroma components corresponding to pixel values (or pixel brightness) in a point with coordinates (x+i, y+j) in the reconstructed frame, O'(x,y) is the filtered pixel with coordinates (x,y) in the reconstructed frame, w(i,j) denotes n-bit integer filter coefficients corresponding to a pixel position with offset (i,j) in respect to the filtered pixel, Lim(i,j) are positive k-bit clipping values, k<BitDepth+1, Lim(i,j)$<=2^{BitDepthLuma}$ for luma components and Lim(i,j)$<=2^{BitDepthChroma}$ for chroma components, index Idx(i,j) can be chosen from a range of positive values from 0 to m, m is a positive integer value. According to an implementation, Idx(i, j)=0, 1, 2 or m.

According to a fourth embodiment, the disclosure relates to an in-loop filtering apparatus for use in a video encoding apparatus or a decoding apparatus, wherein the in-loop filtering apparatus is configured for processing a reconstructed frame for generation of a filtered reconstructed frame, wherein the reconstructed frame comprises a plurality of pixels, each pixel being associated with a pixel value, wherein the in-loop filter apparatus comprises one or more processing circuitry configured to:

filter a pixel (namely a filtering pixel, such as each pixel) from the reconstructed frame, wherein a filtered pixel (such as each pixel) of the filtered reconstructed frame is obtained according to following equation:

$$O'(x, y) = I(x, y) + \sum_{(i,j) \neq (0,0)} w(i, j) \times$$

$$\{Clip[\Delta(x, y, i, j), Lim(i, j)] + Clip[\Delta(x, y, -i, -j), Lim(i, j)]\}$$

$$\Delta(x, y, i, j) = I(x + i, y + j) - I(x, y)$$

$$Clip(\Delta, Lim) = Clip3(-Lim(i, j), Lim(i, j), \Delta)$$

wherein I(x+i,y+j) are positive BitDepthLuma-bit values for luma components or BitDepthChroma-bit values for chroma components corresponding to pixel values (or pixel brightness) in a point with coordinates (x+i, y+j) in the reconstructed frame, O'(x,y) is the filtered pixel with the coordinates (x,y) in the reconstructed frame, w(i,j) denotes n-bit integer filter coefficients corresponding to a pixel position with an offset (i,j) in respect to the filtered pixel, wherein the same clipping levels (or clipping values) Lim(i,j) are applied for the luma component and the chroma component of the pixel (such as I(x,y)) of the reconstructed frame.

The same clipping levels (or clipping values) Lim(i,j) may be applied for the luma component and the chroma component of the current pixel. The same clipping levels table may be used for luma and chroma component filtering.

According to an implementation of the fourth embodiment, the same clipping levels (or clipping values) for the luma component and the chroma component may be determined from a same table based on a bit depth of the luma component and chroma components of the pixel (such as I(x,y)) of the reconstructed frame and clipIdx, wherein clipIdx may be a signaling element which is used for determining which clipping level from the possible clipping levels set can be used for a current tap in a current filter.

According to an implementation of the fourth embodiment, the clipping levels (or clipping values) for the luma component and the chroma component may be determined from a single LUT table defined as follows:

| BitDepth | clipIdx | | | |
|---|---|---|---|---|
| | 0 | 1 | 2 | 3 |
| 8 | $2^8$ | $2^5$ | $2^3$ | $2^1$ |
| 9 | $2^9$ | $2^6$ | $2^4$ | $2^2$ |
| 10 | $2^{10}$ | $2^7$ | $2^5$ | $2^3$ |
| 11 | $2^{11}$ | $2^8$ | $2^6$ | $2^4$ |
| 12 | $2^{12}$ | $2^9$ | $2^7$ | $2^5$ |
| 13 | $2^{13}$ | $2^{10}$ | $2^8$ | $2^6$ |
| 14 | $2^{14}$ | $2^{11}$ | $2^9$ | $2^7$ |
| 15 | $2^{15}$ | $2^{12}$ | $2^{10}$ | $2^8$ |
| 16 | $2^{16}$ | $2^{13}$ | $2^{11}$ | $2^9$ |

The values in the column with clipIdx=0 correspond to the results of the following formulas for the clipping levels Lim(i,j) with Idx(i,j)=0:

$$\mathrm{Lim}(i,j) = 2^{BitDepthLuma * \frac{[4-Idx(i,j)]}{4}} \text{ for luma filtering}$$

$$\mathrm{Lim}(i,j) = 2^{BitDepthChroma * \frac{[4-Idx(i,j)]}{4}} \text{ for chroma filtering}$$

wherein an index Idx(i,j) is chosen from a range of non-negative values from 0 to m, and m is larger than or equal to zero. According to an implementation, Idx(i,j)=0, 1, 2 or m.

According to an implementation of the fourth embodiment, the clipping levels (or clipping values) for the luma component and the chroma component may be determined from a single LUT table defined as follows:

| BitDepth | clipIdx | | | |
|---|---|---|---|---|
| | 0 | 1 | 2 | 3 |
| 8 | $2^8 - 1$ | $2^5$ | $2^3$ | $2^1$ |
| 9 | $2^9 - 1$ | $2^6$ | $2^4$ | $2^2$ |
| 10 | $2^{10} - 1$ | $2^7$ | $2^5$ | $2^3$ |
| 11 | $2^{11} - 1$ | $2^8$ | $2^6$ | $2^4$ |
| 12 | $2^{12} - 1$ | $2^9$ | $2^7$ | $2^5$ |
| 13 | $2^{13} - 1$ | $2^{10}$ | $2^8$ | $2^6$ |
| 14 | $2^{14} - 1$ | $2^{11}$ | $2^9$ | $2^7$ |
| 15 | $2^{15} - 1$ | $2^{12}$ | $2^{10}$ | $2^8$ |
| 16 | $2^{16} - 1$ | $2^{13}$ | $2^{11}$ | $2^9$ |

According to an implementation of the fourth embodiment, the clipping levels (or clipping values) for the luma component and the chroma component may be determined from a single LUT table defined as follows:

| BitDepth | clipIdx | | | |
|---|---|---|---|---|
| | 0 | 1 | 2 | 3 |
| 8 | Undefined | $2^5$ | $2^3$ | $2^1$ |
| 9 | Undefined | $2^6$ | $2^4$ | $2^2$ |
| 10 | Undefined | $2^7$ | $2^5$ | $2^3$ |
| 11 | Undefined | $2^8$ | $2^6$ | $2^4$ |
| 12 | Undefined | $2^9$ | $2^7$ | $2^5$ |
| 13 | Undefined | $2^{10}$ | $2^8$ | $2^6$ |
| 14 | Undefined | $2^{11}$ | $2^9$ | $2^7$ |
| 15 | Undefined | $2^{12}$ | $2^{10}$ | $2^8$ |
| 16 | Undefined | $2^{13}$ | $2^{11}$ | $2^9$ |

According to a fifth embodiment, the disclosure relates to an in-loop filtering method for processing a reconstructed frame from a decoded video stream for generation of a filtered reconstructed frame, wherein the reconstructed frame comprises a plurality of pixels, each pixel being associated with a pixel value, wherein the in-loop filtering method comprises:

filter a pixel (namely a filtering pixel, such as each pixel) from the reconstructed frame, wherein a filtered pixel (such as each pixel) of the filtered reconstructed frame is based on the following formulas:

$$O'(x, y) = I(x, y) + \sum_{(i,j) \neq (0,0)} w(i,j) \times$$

$$\{\mathrm{Clip}[\Delta(x, y, i, j), \mathrm{Lim}(i, j)] + \mathrm{Clip}[\Delta(x, y, -i, -j), \mathrm{Lim}(i, j)]\}$$

$$\Delta(x, y, i, j) = I(x+i, y+j) - I(x, y)$$

$$\mathrm{Clip}(d, b) = \min(b, \max(-b, d))$$

wherein clipping levels (or clipping values) Lim(i,j) are obtained or determined by a table representation (such as a table or a LUT table).

According to an implementation of the fifth embodiment, I(x+i,y+j) are positive BitDepthLuma-bit values for luma components or BitDepthChroma-bit values for chroma components corresponding to pixel values (or pixel brightness) in a point with coordinates (x+i,y+j) in the reconstructed frame, O'(x,y) is the filtered pixel with the coordinates (x,y) in the reconstructed frame, w(i,j) denotes n-bit integer filter coefficients corresponding to a pixel position with an offset (i,j) in respect to the filtered pixel, Lim(i,j) are positive or non-negative clipping values (for example, Lim(i,j)=b in the table).

According to an implementation of the fifth embodiment, $\mathrm{Lim}(i,j) <= 2^{BitDepthLuma} - 1$ for luma components and $\mathrm{Lim}(i,j) < 2^{BitDepthChroma} - 1$ for chroma components.

According to an implementation of the fifth embodiment, the clipping levels Lim(i,j) may be obtained from or determined by the table representation (such as a table or a LUT table), and the table representation may be obtained or generated according to the following same formulas for luma and chroma components:

$$\mathrm{Lim}(i, j) = 2^{BitDepthLuma * \frac{[4-Idx(i,j)]}{4}} - 1 \text{ for luma filtering}$$

$$\mathrm{Lim}(i, j) = 2^{BitDepthChroma * \frac{[4-Idx(i,j)]}{4}} - 1 \text{ for chroma filtering}$$

$$Idx(i, j) = 0$$

and/or $$\mathrm{Lim}(i, j) = 2^{BitDepthLuma * \frac{[4-Idx(i,j)]}{4}} \text{ for luma filtering}$$

$$\mathrm{Lim}(i, j) = 2^{BitDepthChroma * \frac{[4-Idx(i,j)]}{4}} \text{ for chroma filtering}$$

wherein an index Idx(i,j) is chosen from a range of non-negative values from 1 to m, and m is larger than zero. According to an implementation, Idx(i,j)=1, 2 or m.

According to an implementation of the fifth embodiment, the clipping levels Lim(i,j) may be obtained from or determined by the table representation (such as a table or a LUT table), and the table representation may be obtained or generated according to the following formulas for luma and chroma components:

$$\text{Lim}(i, j) = 2^{BitDepth * \frac{[4-Idx(i,j)]}{4}} - 1$$

$$Idx(i, j) = 0$$

and/or $$\text{Lim}(i, j) = 2^{BitDepthLuma * \frac{[4-Idx(i,j)]}{4}} \text{ for luma filtering}$$

wherein an index Idx(i,j) is chosen from a range of non-negative values from 1 to m, and m is larger than zero, and wherein BitDepth represents BitDepthLuma or BitDepthChroma. According to an implementation, Idx(i,j)=1, 2 or m.

According to an implementation of the fifth embodiment, the clipping levels Lim(i,j) may be obtained from or determined by the table representation (such as a table or a LUT table), and the same table representation may be used for luma and chroma components.

According to an implementation of the fifth embodiment, the clipping levels may be less or equal to $2^{BitDepth}-1$, wherein BitDepth is a bit depth of a filtering component (such as a luma component or one from two chroma components) of the pixel (such as I(x,y)) of the reconstructed frame or BitDepth is the maximal number of bits in a sample (pixel) of the respective component of the reconstructed frame.

According to an implementation of the fifth embodiment, the clipping levels Lim(i,j) may be obtained from or determined by the following table representation:

If idx=Idx(i,j)=0, 1, 2 or 3:
  if BitDepthLuma equal to 8, then clipping level Lim(idx)=[255, 63, 15, 3];
  if BitDepthLuma equal to 9, then clipping level Lim(idx)=[511, 107, 22, 4];
  if BitDepthLuma equal to 10, then clipping level Lim(idx)=[1023, 180, 31, 5];
  if BitDepthLuma equal to 11, then clipping level Lim(idx)=[2047, 303, 44, 6];
  if BitDepthLuma equal to 12, then clipping level Lim(idx)=[4095, 511, 63, 7];
  if BitDepthLuma equal to 13, then clipping level Lim(idx)=[8191, 860, 90, 9];
  if BitDepthLuma equal to 14, then clipping level Lim(idx)=[16383, 1447, 127, 10];
  if BitDepthLuma equal to 15, then clipping level Lim(idx)=[32767, 2434, 180, 12]; and/or
  if BitDepthLuma equal to 16, then clipping level Lim(idx)=[65535, 4095, 255, 15].

According to an implementation of the fifth embodiment, the clipping levels Lim(i,j) may be obtained from or determined by the following table representation:

If idx=Idx(I,j)=0, 1, 2 or 3:
  if BitDepthLuma equal to 8, then clipping level Lim(idx)=[255, 64, 16, 4];
  if BitDepthLuma equal to 9, then clipping level Lim(idx)=[511, 108, 23, 5];
  if BitDepthLuma equal to 10, then clipping level Lim(idx)=[1023, 181, 32, 6];
  if BitDepthLuma equal to 11, then clipping level Lim(idx)=[2047, 304, 45, 7];
  if BitDepthLuma equal to 12, then clipping level Lim(idx)=[4095, 512, 64, 8];
  if BitDepthLuma equal to 13, then clipping level Lim(idx)=[8191, 861, 91, 10];
  if BitDepthLuma equal to 14, then clipping level Lim(idx)=[16383, 1448, 128, 11];
  if BitDepthLuma equal to 15, then clipping level Lim(idx)=[32767, 2435, 181, 13]; and/or
  if BitDepthLuma equal to 16, then clipping level Lim(idx)=[65535, 4096, 256, 16].

According to an implementation of the fifth embodiment, for luma component filtering,
  if BitDepthLuma equal to 16, then maximal clipping level Lim(i,j)=65535;
  if BitDepthLuma equal to 15, then maximal clipping level. Lim(i,j)=32767;
  if BitDepthLuma equal to 14, then maximal clipping level Lim(i,j)=16383;
  if BitDepthLuma equal to 13, then maximal clipping level Lim(i,j)=8191;
  if BitDepthLuma equal to 12, then maximal clipping level Lim(i,j)=4095,
  if BitDepthLuma equal to 11, then maximal clipping level Lim(i,j)=2047;
  if BitDepthLuma equal to 10, then maximal clipping level Lim(i,j)=1023,
  if BitDepthLuma equal to 9, then maximal clipping level Lim(i,j)=511, and/or.
  if BitDepthLuma equal to 8, then maximal clipping level Lim(i,j)=255.

According to an implementation of the fifth embodiment, for chroma component filtering,
  if BitDepthChroma equal to 16, then maximal clipping level Lim(ij)=65535;
  if BitDepthChroma equal to 15, then maximal clipping level. Lim(i,j)=32767;
  if BitDepthChroma equal to 14, then maximal clipping level Lim(i,j)=16383;
  if BitDepthChroma equal to 13, then maximal clipping level Lim(i,j)=8191;
  if BitDepthChroma equal to 12, then maximal clipping level Lim(i,j)=4095,
  if BitDepthChroma equal to 11, then maximal clipping level Lim(i,j)=2047.
  if BitDepthChroma equal to 10, then maximal clipping level Lim(i,j)=1023,
  if BitDepthChroma equal to 9, then maximal clipping level Lim(i,j)=511, and/or
  if BitDepthChroma equal to 8, then maximal clipping level Lim(i,j)=255.

According to a sixth embodiment, the disclosure relates to an in-loop filtering apparatus for use in a video encoding apparatus or a decoding apparatus, wherein the in-loop filtering apparatus is configured for processing a reconstructed frame for generation of a filtered reconstructed frame, wherein the reconstructed frame comprises a plurality of pixels, each pixel being associated with a pixel value, wherein the in-loop filter apparatus comprises one or more processing circuitry configured to:

filter a pixel (namely a filtering pixel, such as each pixel) from the reconstructed frame, wherein a filtered pixel (such as each pixel) of the filtered reconstructed frame is based on the following formulas:

$$O'(x, y) = I(x, y) + \sum_{(i,j) \neq (0,0)} w(i, j) \times$$

$$\{\text{Clip}[\Delta(x, y, i, j), \text{Lim}(i, j)] + \text{Clip}[\Delta(x, y, -i, -j), \text{Lim}(i, j)]\}$$

$$\Delta(x, y, i, j) = I(x+i, y+j) - I(x, y)$$

$$\text{Clip}(d, b) = \min(b, \max(-b, d))$$

wherein clipping levels (or clipping values) Lim(i,j) are obtained from or determined by a table representation (such as a table or a LUT table).

According to an implementation of the sixth embodiment, I(x+i,y+j) are positive BitDepthLuma-bit values for luma components or BitDepthChroma-bit values for chroma components corresponding to pixel values (or pixel brightness) in a point with coordinates (x+i,y+j) in the reconstructed frame, O'(x,y) is the filtered pixel with the coordinates (x,y) in the reconstructed frame, w(i,j) denotes n-bit integer filter coefficients corresponding to a pixel position with an offset (i,j) in respect to the filtered pixel, Lim(i,j) are positive or non-negative clipping values (for example, Lim(i,j)=b in the table).

According to an implementation of the sixth embodiment, $\text{Lim}(i,j) \leq 2^{BitDepthLuma}-1$ for luma components and $\text{Lim}(i,j) \leq 2^{BitDepthChroma}-1$ for chroma components.

According to an implementation of the sixth embodiment, the clipping levels Lim(i,j) may be obtained from or determined by the table representation (such as a table or a LUT table), and the table representation may be obtained or generated according to the following same formulas for luma and chroma components:

$$\text{Lim}(i, j) = 2^{BitDepthLuma*\frac{[4-Idx(i,j)]}{4}} - 1 \text{ for luma filtering}$$

$$\text{Lim}(i, j) = 2^{BitDepthChroma*\frac{[4-Idx(i,j)]}{4}} - 1 \text{ for chroma filtering}$$

$$Idx(i, j) = 0$$

and/or $$\text{Lim}(i, j) = 2^{BitDepthLuma*\frac{[4-Idx(i,j)]}{4}} \text{ for luma filtering}$$

$$\text{Lim}(i, j) = 2^{BitDepthChroma*\frac{[4-Idx(i,j)]}{4}} \text{ for chroma filtering}$$

wherein an index Idx(i,j) is chosen from a range of non-negative values from 1 to m, and m is larger than zero. According to an implementation, Idx(i,j)=1, 2 or m.

According to an implementation of the sixth embodiment, the clipping levels Lim(i,j) may be obtained from or determined by the table representation (such as a table or a LUT table), and the table representation may be obtained or generated according to the following formulas for luma and chroma components:

$$\text{Lim}(i, j) = 2^{BitDepth*\frac{[4-Idx(i,j)]}{4}} - 1$$

$$Idx(i, j) = 0$$

and/or $$\text{Lim}(i, j) = 2^{BitDepthLuma*\frac{[4-Idx(i,j)]}{4}} \text{ for luma filtering}$$

wherein an index Idx(i,j) is chosen from a range of non-negative values from 1 to m, and m is larger than zero, and wherein BitDepth represents BitDepthLuma or BitDepthChroma. According to an implementation, Idx(i,j)=1, 2 or m.

According to an implementation of the sixth embodiment, the clipping levels Lim(i,j) may be obtained from or determined by the table representation (such as a table or a LUT table), and the same table representation may be used for luma and chroma components.

According to an implementation of the sixth embodiment, the clipping levels may be less or equal to $2^{BitDepth}-1$, wherein BitDepth is a bit depth of a filtering component (such as a luma component or one from two chroma components) of the pixel (such as I(x,y)) of the reconstructed frame or BitDepth is the maximal number of bits in a sample (pixel) of the respective component of the reconstructed frame.

According to an implementation of the sixth embodiment, the clipping levels Lim(i,j) may be obtained from or determined by the following table representation:

If idx=Idx(i,j)=0, 1, 2 or 3:
  if BitDepthLuma equal to 8, then clipping level Lim(idx)=[255, 63, 15, 3];
  if BitDepthLuma equal to 9, then clipping level Lim(idx)=[511, 107, 22, 4];
  if BitDepthLuma equal to 10, then clipping level Lim(idx)=[1023, 180, 31, 5];
  if BitDepthLuma equal to 11, then clipping level Lim(idx)=[2047, 303, 44, 6];
  if BitDepthLuma equal to 12, then clipping level Lim(idx)=[4095, 511, 63, 7];
  if BitDepthLuma equal to 13, then clipping level Lim(idx)=[8191, 860, 90, 9];
  if BitDepthLuma equal to 14, then clipping level Lim(idx)=[16383, 1447, 127, 10];
  if BitDepthLuma equal to 15, then clipping level Lim(idx)=[32767, 2434, 180, 12]; and/or
  if BitDepthLuma equal to 16, then clipping level Lim(idx)=[65535, 4095, 255, 15].

According to an implementation of the sixth embodiment, the clipping levels Lim(i,j) may be obtained from or determined by the following table representation:

If idx=Idx(I,j)=0, 1, 2 or 3:
  if BitDepthLuma equal to 8, then clipping level Lim(idx)=[255, 64, 16, 4];
  if BitDepthLuma equal to 9, then clipping level Lim(idx)=[511, 108, 23, 5];
  if BitDepthLuma equal to 10, then clipping level Lim(idx)=[1023, 181, 32, 6];
  if BitDepthLuma equal to 11, then clipping level Lim(idx)=[2047, 304, 45, 7];
  if BitDepthLuma equal to 12, then clipping level Lim(idx)=[4095, 512, 64, 8];
  if BitDepthLuma equal to 13, then clipping level Lim(idx)=[8191, 861, 91, 10];
  if BitDepthLuma equal to 14, then clipping level Lim(idx)=[16383, 1448, 128, 11];

if BitDepthLuma equal to 15, then clipping level Lim(idx)=[32767, 2435, 181, 13]; and/or if BitDepthLuma equal to 16, then clipping level Lim(idx)=[65535, 4096, 256, 16].

According to an implementation of the sixth embodiment, for luma component filtering, if BitDepthLuma equal to 16, then maximal clipping level Lim(i,j)=65535;

if BitDepthLuma equal to 15, then maximal clipping level. Lim(i,j)=32767;

if BitDepthLuma equal to 14, then maximal clipping level Lim(i,j)=16383;

if BitDepthLuma equal to 13, then maximal clipping level Lim(i,j)=8191;

if BitDepthLuma equal to 12, then maximal clipping level Lim(i,j)=4095, if BitDepthLuma equal to 11, then maximal clipping level Lim(i,j)=2047;

if BitDepthLuma equal to 10, then maximal clipping level Lim(i,j)=1023, if BitDepthLuma equal to 9, then maximal clipping level Lim(i,j)=511, and/or.

if BitDepthLuma equal to 8, then maximal clipping level Lim(i,j)=255.

According to an implementation of the sixth embodiment, for chroma component filtering, if BitDepthChroma equal to 16, then maximal clipping level Lim(ij)=65535;

if BitDepthChroma equal to 15, then maximal clipping level. Lim(i,j)=32767;

if BitDepthChroma equal to 14, then maximal clipping level Lim(i,j)=16383;

if BitDepthChroma equal to 13, then maximal clipping level Lim(i,j)=8191;

if BitDepthChroma equal to 12, then maximal clipping level Lim(i,j)=4095, if BitDepthChroma equal to 11, then maximal clipping level Lim(i,j)=2047.

if BitDepthChroma equal to 10, then maximal clipping level Lim(i,j)=1023, if BitDepthChroma equal to 9, then maximal clipping level Lim(i,j)=511, and/or if BitDepthChroma equal to 8, then maximal clipping level Lim(i,j)=255.

According to a seventh embodiment, the disclosure relates to a computer program product comprising program code for performing any one of the methods according to the second and fifth embodiments when executed on a computer or a processor.

According to an eighth embodiment, the disclosure relates to a decoder, comprising one or more processors, and a non-transitory computer-readable storage medium coupled to the processors and storing programming for execution by the processors, wherein the programming, when executed by the processors, configures the decoder to carry out any one of the methods according to the second and fifth embodiments.

According to a ninth embodiment, the disclosure relates to an encoder, comprising one or more processors, and a non-transitory computer-readable storage medium coupled to the processors and storing programming for execution by the processors, wherein the programming, when executed by the processors, configures the encoder to carry out any one of the methods according to the second and fifth embodiments.

According to a tenth embodiment, the disclosure relates to a non-transitory computer-readable medium carrying a program code which, when executed by a computer device, causes the computer device to perform any one of the methods according to the second and fifth embodiments.

Following is an explanation of the applications of the encoding method as well as the decoding method as shown in the above-mentioned embodiments, and a system using them.

Figure 10:
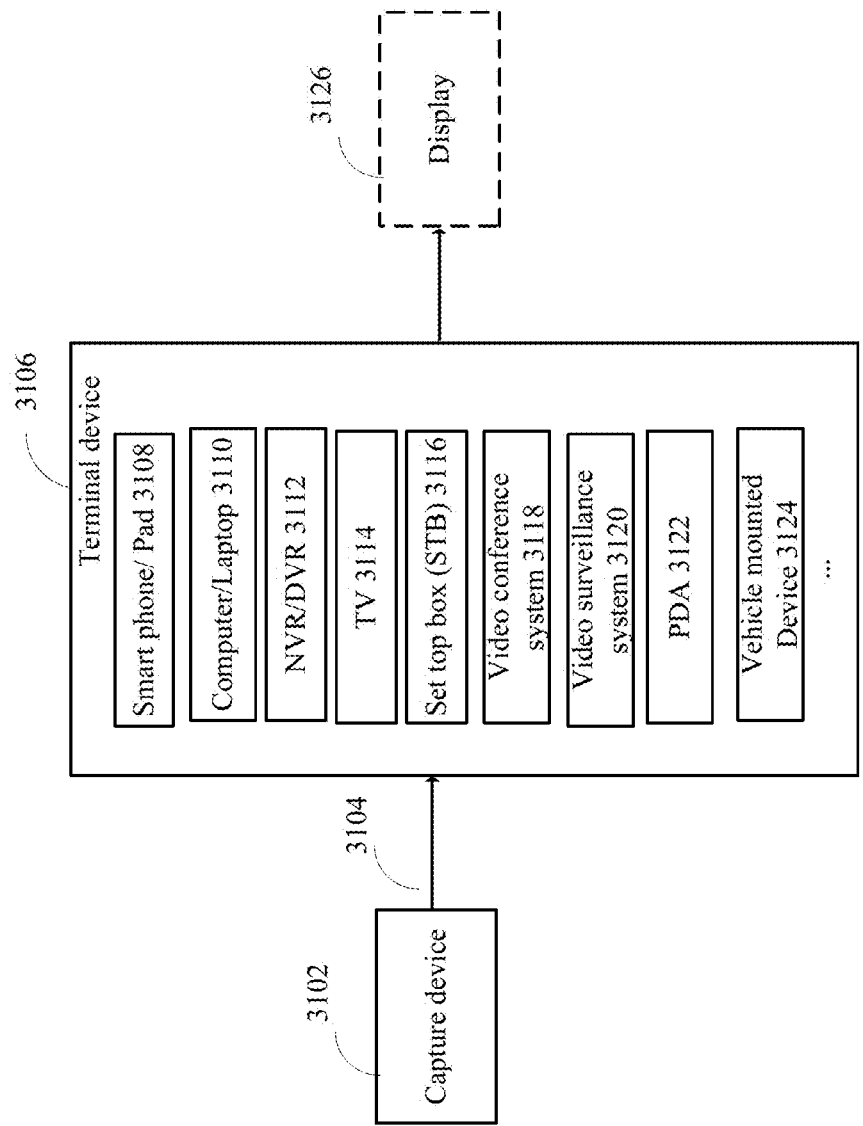
FIG. 10 is a block diagram showing an example structure of a content supply system which realizes a content delivery service.

FIG. 10 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 11:
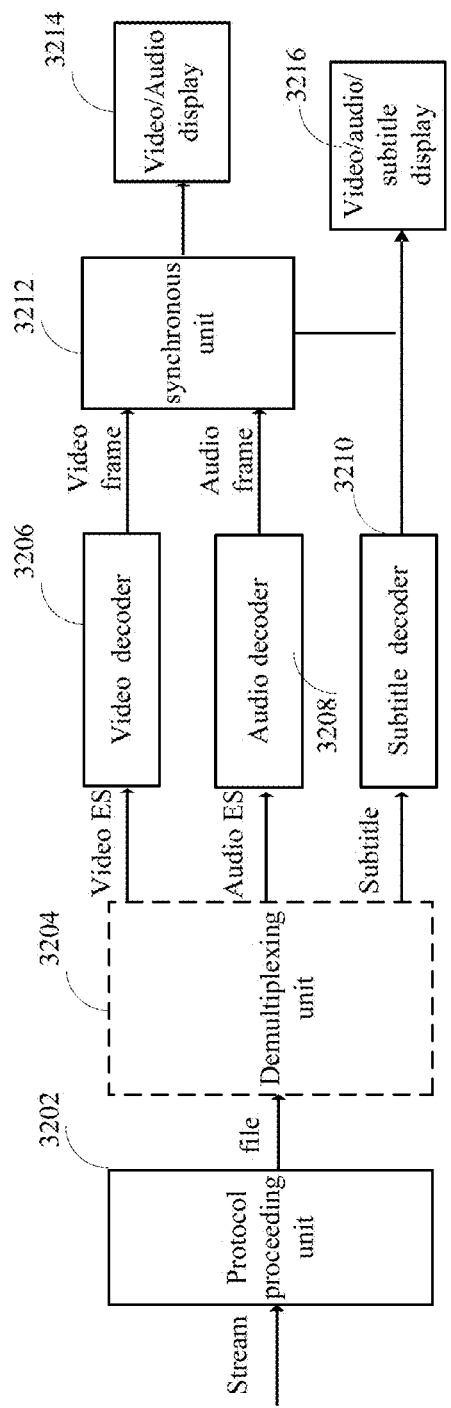
FIG. 11 is a block diagram showing a structure of an example of a terminal device.
Figure 12:
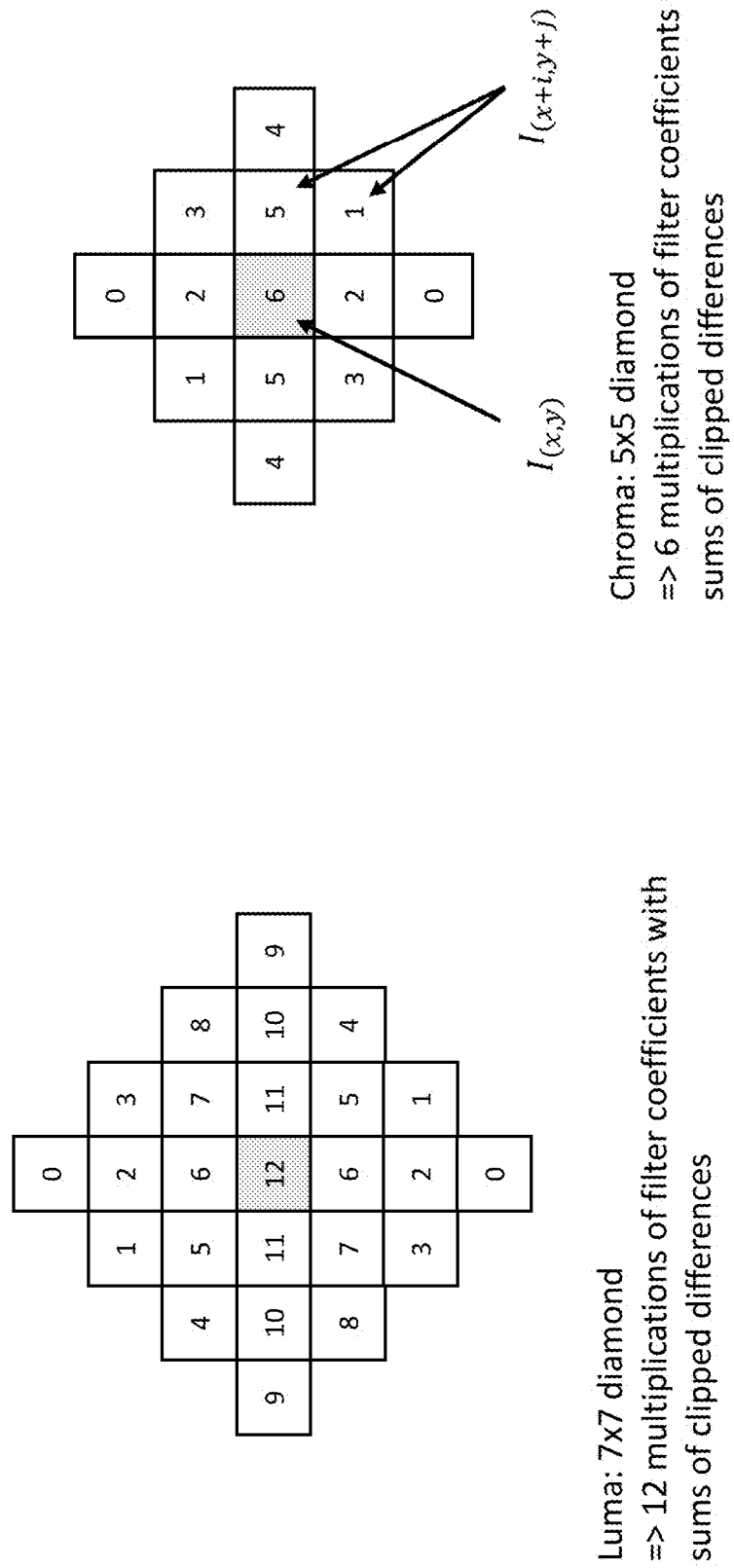
FIG. 12 shows exemplary 7×7 and 5×5 diamond-shaped filter taps for the ALF.

FIG. 11 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 11) before feeding it to the synchronous unit 3212. Similarly, the audio frame may store in a buffer (not shown in FIG. 11) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, i.e. "the first" is equivalent to the 0-th, "the second" is equivalent to the 1st, etc.

Arithmetic Operators

The following arithmetic operators are defined as follows:

| | |
|---|---|
| + | Addition |
| − | Subtraction (as a two-argument operator) or negation (as a unary prefix operator) |
| * | Multiplication, including matrix multiplication |
| $x^y$ | Exponentiation. Specifies x to the power of y. In other contexts, such notation is used for superscripting not intended for interpretation as exponentiation. |
| / | Integer division with truncation of the result toward zero. For example, 7 / 4 and −7 / −4 are truncated to 1 and −7 / 4 and 7 / −4 are truncated to −1. |
| ÷ | Used to denote division in mathematical equations where no truncation or rounding is intended. |
| $\frac{x}{y}$ | Used to denote division in mathematical equations where no truncation or rounding is intended. |
| $\sum_{i=x}^{y} f(i)$ | The summation of f( i ) with i taking all integer values from x up to and including y. |
| x % y | Modulus. Remainder of x divided by y, defined only for integers x and y with x >= 0 and y > 0. |

Logical Operators

The following logical operators are defined as follows:

x && y Boolean logical "and" of x and y x||y Boolean logical "or" of x and y

! Boolean logical "not"

x?y:z If x is TRUE or not equal to 0, evaluates to the value of y; otherwise, evaluates to the value of z.

Relational Operators

The following relational operators are defined as follows:

> Greater than

>= Greater than or equal to

< Less than

<= Less than or equal to

== Equal to

!= Not equal to

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

−− Decrement, i.e., x−− is equivalent to x=x−1; when used in an array index, evaluates to the value of the variable prior to the decrement operation.

+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Range Notation

The following notation is used to specify a range of values:

x=y . . . z x takes on integer values starting from y to z, inclusive, with x, y, and z being integer numbers and z being greater than y.

Mathematical Functions

The following mathematical functions are defined:

$$\text{Abs}(x) = \begin{cases} x; & x >= 0 \\ -x; & x < 0 \end{cases}$$

Asin(x) the trigonometric inverse sine function, operating on an argument x that is in the range of −1.0 to 1.0, inclusive, with an output value in the range of −π÷2 to π÷2, inclusive, in units of radians.

Atan(x) the trigonometric inverse tangent function, operating on an argument x, with an output value in the range of −π÷2 to π÷2, inclusive, in units of radians.

$$\text{Atan2}(y, x) = \begin{cases} \text{Atan}\left(\frac{y}{x}\right); & x > 0 \\ \text{Atan}\left(\frac{y}{x}\right) + \pi; & x < 0 \,\&\&\, y >= 0 \\ \text{Atan}\left(\frac{y}{x}\right) - \pi; & x < 0 \,\&\&\, y < 0 \\ +\frac{\pi}{2}; & x == 0 \,\&\&\, y >= 0 \\ -\frac{\pi}{2}; & \text{otherwise} \end{cases}$$

Ceil(x) the smallest integer greater than or equal to x.

Clip1$_Y$(x)=Clip3(0, (1<<BitDepth$_Y$)−1, x)

Clip1$_C$(x)=Clip3(0, (1<<BitDepth$_C$)−1, x)

$$\text{Clip3}(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$\text{GetCurrMsb}(a, b, c, d) = \begin{cases} c + d; & b - a >= d/2 \\ c - d; & a - b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$\text{Min}(x, y) = \begin{cases} x; & x <= y \\ y; & x > y \end{cases}$$

$$\text{Max}(x, y) = \begin{cases} x; & x >= y \\ y; & x < y \end{cases}$$

Round(x) = Sign(x) * Floor(Abs(x) + 0.5)

$$\text{Sign}(x) = \begin{cases} 1; & x > 0 \\ 0; & x == 0 \\ -1; & x < 0 \end{cases}$$

Sin(x) the trigonometric sine function operating on an argument x in units of radians Sqrt(x)=$\sqrt{x}$ Swap(x,y)=(y,x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

| Operation precedence from highest (at top of table) to lowest (at bottom of table) |
| --- |
| operations (with operands x, y, and z) |
| "x++", "x− −" |
| "!x", "−x" (as a unary prefix operator) |
| x$^y$ |
| "x * y", "x / y", "x ÷ y", "x/y", "x % y" |
| "x + y", "x − y" (as a two-argument operator), "$\sum_{i=x}^{y} f(i)$" |
| "x << y", "x >> y" |

| TABLE-continued |
| --- |
| Operation precedence from highest (at top of table) to lowest (at bottom of table) |
| operations (with operands x, y, and z) |
| "x < y", "x <= y", "x > y", "x >= y"<br>"x = = y", "x != y"<br>"x & y"<br>"x \| y"<br>"x && y"<br>"x \|\| y"<br>"x ? y : z"<br>"x..y"<br>"x = y", "x += y", "x -= y" |

Text Description of Logical Operations

In the text, a statement of logical operations as would be described mathematically in the following form:

if(condition 0)
        statement 0
    else if(condition 1)
        statement 1
    . . .
    else/*informative remark on remaining condition*/
        statement n may be described in the following manner:

. . . as follows/ . . . the following applies:
      If condition 0, statement 0
      Otherwise, if condition 1, statement 1
      . . .
        Otherwise (informative remark on remaining condition), statement n Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " may always be an "Otherwise, . . . ". Interleaved "If . . . Otherwise, if . . . Otherwise, . . . " statements can be identified by matching " . . . as follows" or " . . . the following applies" with the ending "Otherwise . . . ".

In the text, a statement of logical operations as would be described mathematically in the following form:

if(condition 0a && condition 0b)
        statement 0
    else if(condition 1a\|\|condition 1b)
        statement 1
    . . .
    else
        statement n may be described in the following manner:

. . . as follows/ . . . the following applies:
    If all of the following conditions are true, statement 0:
      condition 0a
      condition 0b
    Otherwise, if one or more of the following conditions are true, statement 1:
      condition 1a
      condition 1b
    . . .
    Otherwise, statement n In the text, a statement of logical operations as would be described mathematically in the following form:

if(condition 0)
        statement 0
    if(condition 1)
        statement 1 may be described in the following manner:

When condition 0, statement 0
    When condition 1, statement 1

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and the video decoder 30 may equally be used for still picture processing, e.g. residual calculation 204/304, transform 206, quantization 208, inverse quantization 210/310, (inverse) transform 212/312, partitioning 262, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which correspond to tangible media such as data storage media, or communication media including any medium that facilitates transfer of a computer program from one place to another, e.g., according to a communication protocol. In this manner, computer-readable media generally may correspond to (1) tangible computer-readable storage media which are non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, include compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A method for in-loop filtering by performing adaptive loop filtering on a reconstructed frame of a video stream, implemented by an encoding device or a decoding device, the method comprising:
    forming differences between at least one of luma and chroma components of a pixel of the reconstructed frame and the at least one of luma and chroma components of neighboring pixels in a connected area of the pixel;
    clipping the differences according to respective clipping levels;
    forming a weighted sum of the clipped differences; and
    adding the weighted sum to the at least one of luma and chroma components of the pixel to determine a filtered respective component of the pixel,
    wherein the respective clipping levels are chosen from a same set of clipping levels for the luma and chroma components when luma bit depth, BitDepthLuma, is same as chroma bit depth, BitDepthChroma;
wherein the set of clipping levels for the luma and chroma components is determined according to the following equations:

Lim($i,j$)=[1<<(BitDepthLuma−ShiftConst[Idx($i,j$)])]
        for luma component Lim($i,j$)=[1<<(BitDepthChroma−ShiftConst[Idx($i,j$)])]
        for chroma components Idx($i,j$)=0,1,2,3

ShiftConst[0]=0,ShiftConst[1]=3,ShiftConst[2]=5, ShiftConst[3]=7

Or

ShiftConst[0]=0,ShiftConst[1]=2,ShiftConst[2]=4, ShiftConst[3]=6 through variation of the bit depth of the luma component BitDepthLuma and the chroma components BitDepthChroma as well as an index Idx(i,j).

2. The method of claim 1, wherein the respective clipping levels are chosen according to a bit depth of the at least one of luma and chroma components of the pixel.

3. The method of claim 1, wherein the respective clipping levels are chosen according to respective clipping indices for the respective neighboring pixels in the connected area.

4. The method of claim 3, wherein the respective clipping indices are signaled in the video stream.

5. The method of claim 1, wherein the respective clipping levels are positive clipping values that are less than or equal to $2^{BitDepth}-1$, or the respective clipping levels are positive clipping values that are less than or equal to $2^{BitDepth}$, wherein BitDepth denotes a bit depth of the at least one of luma and chroma components.

6. The method of claim 1, wherein the filtered respective component O'(x,y) of the pixel with coordinates (x,y) in the reconstructed frame is obtained according to the following equation:

$$O'(x, y) = I(x, y) + \sum_{(i,j) \neq (0,0)} w(i, j) \times$$
$$\{\text{Clip}[\Delta(x, y, i, j), \text{Lim}(i, j)] + \text{Clip}[\Delta(x, y, -i, -j), \text{Lim}(i, j)]\}$$
$$\Delta(x, y, i, j) = I(x+i, y+j) - I(x, y)$$
$$\text{Clip}(\Delta, \text{Lim}) = Clip3(-\text{Lim}(i, j), \text{Lim}(i, j), \Delta)$$
$$Clip3(x, y, z) = \begin{cases} x; & z < x \\ y; & z > y \\ z; & \text{otherwise} \end{cases}$$

wherein I(x+i, y+j) are positive BitDepthLuma-bit values for luma components or BitDepthChroma-bits values for chroma components of the pixel with coordinates (x+i, y+j) in the reconstructed frame, w(i,j) denotes n-bit integer filter coefficients corresponding to neighboring pixels in the connected area of the pixel with offsets (i j) in respect to the filtered respective component of the pixel, and Lim(i,j) denotes the respective clipping levels corresponding to the neighboring pixels in the connected area of the pixel with offsets (i,j).

7. The method of claim 6, wherein the respective clipping levels are positive k-bits clipping values with k<=BitDepth, wherein BitDepth denotes a bit depth of the at least one of luma and chroma components.

8. The method of claim 6, wherein the respective clipping levels are Lim(i,j)<=$2^{BitDepthLuma}$−1 for luma components and Lim(i,j)<=$2^{BitDepthChroma}$−1 for chroma components; or the respective clipping levels are Lim(i,j)<=$2^{BitDepthLuma}$ for luma components and Lim(i,j)<=$2^{BitDepthChroma}$ for chroma components.

9. The method of claim 1, wherein the respective clipping levels are chosen from a look-up table (LUT) representing the set of clipping levels for the luma and chroma components.

10. The method of claim 9, wherein the LUT is defined as follows:

|           | clipIdx  |       |       |       |
|-----------|----------|-------|-------|-------|
| BitDepth  | 0        | 1     | 2     | 3     |
| 8         | $2^8 - 1$ | $2^5$ | $2^3$ | $2^1$ |
| 9         | $2^9 - 1$ | $2^6$ | $2^4$ | $2^2$ |
| 10        | $2^{10} - 1$ | $2^7$ | $2^5$ | $2^3$ |

-continued

| BitDepth | clipIdx | | | |
|---|---|---|---|---|
| | 0 | 1 | 2 | 3 |
| 11 | $2^{11}-1$ | $2^8$ | $2^6$ | $2^4$ |
| 12 | $2^{12}-1$ | $2^9$ | $2^7$ | $2^5$ |
| 13 | $2^{13}-1$ | $2^{10}$ | $2^8$ | $2^6$ |
| 14 | $2^{14}-1$ | $2^{11}$ | $2^9$ | $2^7$ |
| 15 | $2^{15}-1$ | $2^{12}$ | $2^{10}$ | $2^8$ |
| 16 | $2^{16}-1$ | $2^{13}$ | $2^{11}$ | $2^9$ | wherein BitDepth denotes a bit depth of the at least one of luma and chroma components and clipIdx denotes a clipping index.

11. The method of claim 9, wherein the LUT is defined as follows:

| BitDepth | clipIdx | | | |
|---|---|---|---|---|
| | 0 | 1 | 2 | 3 |
| 8 | $2^8$ | $2^5$ | $2^3$ | $2^1$ |
| 9 | $2^9$ | $2^6$ | $2^4$ | $2^2$ |
| 10 | $2^{10}$ | $2^7$ | $2^5$ | $2^3$ |
| 11 | $2^{11}$ | $2^8$ | $2^6$ | $2^4$ |
| 12 | $2^{12}$ | $2^9$ | $2^7$ | $2^5$ |
| 13 | $2^{13}$ | $2^{10}$ | $2^8$ | $2^6$ |
| 14 | $2^{14}$ | $2^{11}$ | $2^9$ | $2^7$ |
| 15 | $2^{15}$ | $2^{12}$ | $2^{10}$ | $2^8$ |
| 16 | $2^{16}$ | $2^{13}$ | $2^{11}$ | $2^9$ | wherein BitDepth denotes a bit depth of the at least one of luma and chroma components and clipIdx denotes a clipping index.

12. The method of claim 1, wherein in-loop filtering is applied for luma and chroma components of the reconstructed frame.

13. An in-loop filtering apparatus for use in a video encoding apparatus or a decoding apparatus, wherein the in-loop filtering apparatus is configured for processing a reconstructed frame for generation of a filtered reconstructed frame, wherein the reconstructed frame comprises a plurality of pixels, each pixel being associated with a pixel value, and wherein the in-loop filter apparatus comprises one or more processing circuitry configured to carry out the method according to claim 1.

14. An encoder comprising processing circuitry for carrying out the method according to claim 1.

15. A decoder comprising processing circuitry for carrying out the method according to claim 1.

16. A computer program product comprising instructions which, when executed by a computer, cause the computer to carry out the method according to claim 1.

17. An encoder, comprising:
one or more processors; and
a non-transitory computer-readable storage medium coupled to the one or more processors and storing instructions for execution by the one or more processors, wherein the instructions, when executed by the one or more processors, configure the encoder to carry out the method according to claim 1.

18. A decoder, comprising:
one or more processors; and
a non-transitory computer-readable storage medium coupled to the one or more processors and storing instructions for execution by the one or more processors, wherein the instructions, when executed by the one or more processors, configure the decoder to carry out the method according to claim 1.

19. An encoder for processing a reconstructed frame for generation of a filtered reconstructed frame, wherein the reconstructed frame comprises a plurality of pixels, each pixel being associated with a pixel value, and wherein the encoder comprises:
a subtracting unit configured to form differences between at least one of luma and chroma components of a pixel of the reconstructed frame and the at least one of luma and chroma components of neighboring pixels in a connected area of the pixel;
a clipping unit configured to clip the differences according to respective clipping levels;
a first adding unit configured to form a weighted sum of the clipped differences; and
a second adding unit configured to add the weighted sum to the at least one of luma and chroma components of the pixel to determine a filtered respective component of the pixel,
wherein the respective clipping levels are chosen from a same set of clipping levels for the luma and chroma components when luma bit depth, BitDepthLuma, is same as chroma bit depth, BitDepthChroma;
wherein the set of clipping levels for the luma and chroma components is determined according to the following equations:

$\text{Lim}(i,j)=[1<<(\text{BitDepthLuma}-\text{ShiftConst}[\text{Idx}(i,j)])]$
for luma component $\text{Lim}(i,j)=[1<<(\text{BitDepthChroma}-\text{ShiftConst}[\text{Idx}(i,j)])]$
for chroma components $\text{Idx}(i,j)=0,1,2,3$ ShiftConst[0]=0,ShiftConst[1]=3,ShiftConst[2]=5, ShiftConst[3]=7

Or

ShiftConst[0]=0,ShiftConst[1]=2,ShiftConst[2]=4, ShiftConst[3]=6 through variation of the bit depth of the luma component BitDepthLuma and the chroma components BitDepthChroma as well as an index Idx(i,j).

20. A decoder for processing a reconstructed frame for generation of a filtered reconstructed frame, wherein the reconstructed frame comprises a plurality of pixels, each pixel being associated with a pixel value, and wherein the decoder comprises:
a subtracting unit configured to form differences between at least one of luma and chroma components of a pixel of the reconstructed frame and the at least one of luma and chroma components of neighboring pixels in a connected area of the pixel;
a clipping unit configured to clip the differences according to respective clipping levels;
a first adding unit configured to form a weighted sum of the clipped differences; and
a second adding unit configured to add the weighted sum to the at least one of luma and chroma components of the pixel to determine a filtered respective component of the pixel,
wherein the respective clipping levels are chosen from a same set of clipping levels for the luma and chroma components when luma bit depth, BitDepthLuma, is same as chroma bit depth, BitDepthChroma;

wherein the set of clipping levels for the luma and chroma components is determined according to the following equations:

$$Lim(i,j)=[1<<(BitDepthLuma-ShiftConst[Idx(i,j)])] \text{ for luma component}$$

$$Lim(i,j)=[1<<(BitDepthChroma-ShiftConst[Idx(i,j)])] \text{ for chroma components}$$

$$Idx(i,j)=0,1,2,3$$

$$ShiftConst[0]=0, ShiftConst[1]=3, ShiftConst[2]=5, ShiftConst[3]=7$$

Or $$ShiftConst[0]=0, ShiftConst[1]=2, ShiftConst[2]=4, ShiftConst[3]=6$$

through variation of the bit depth of the luma component BitDepthLuma and the chroma components BitDepthChroma as well as an index Idx(i,j).

* * * * *